(12) United States Patent
Swift et al.

(10) Patent No.: US 6,216,951 B1
(45) Date of Patent: Apr. 17, 2001

(54) OPTICAL SCANNER WITH HAND-HELD AND HANDS-FREE MODES OF USE

(75) Inventors: Philip Swift, Port Jefferson; Ian Jenkins, Stony Brook; Edward Barkan, Miller Place; Daniel Curry, Deer Park; Ellen Oppenheim, Coram; Michael Ryder, Moriches; Robert Wild, Northport; John Carricato, Ridge; Jean Tu, Stony Brook; Joseph Giordano, Bayville, all of NY (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 09/539,689

(22) Filed: Mar. 31, 2000

Related U.S. Application Data

(60) Division of application No. 08/798,501, filed on Feb. 10, 1997, now Pat. No. 6,053,413, which is a continuation-in-part of application No. 08/367,977, filed on Jan. 3, 1995, and a continuation-in-part of application No. 08/642,670, filed on May 3, 1996, which is a division of application No. 08/419,916, filed on Apr. 11, 1995, which is a division of application No. 08/028,107, filed on Mar. 8, 1993, now Pat. No. 5,408,081, which is a continuation-in-part of application No. 07/721,951, filed on Jun. 27, 1991, now abandoned, which is a division of application No. 07/510,074, filed on Apr. 13, 1990, now Pat. No. 5,059,779, which is a continuation-in-part of application No. 07/367,335, filed on Jun. 16, 1989, now Pat. No. 5,124,539.

(51) Int. Cl.$^7$ .............................. G06K 7/10; G06K 9/22
(52) U.S. Cl. .................. 235/462.45; 235/462.43; 235/462.47; 235/462.46; 235/462.48; 235/472.01; 235/472.02
(58) Field of Search ..................... 235/462.45, 462.43, 235/462.47, 462.48, 462.46, 472.01, 472.02, 454, 383

(56) References Cited

U.S. PATENT DOCUMENTS

| 5,140,414 | * | 8/1992 | Inagaki et al. | 235/462.45 |
| 5,340,973 | * | 8/1994 | Knowles et al. | 235/472.01 |
| 5,796,091 | * | 8/1998 | Schmidt et al. | 235/472.01 |
| 5,942,743 | * | 8/1999 | Schmidt et al. | 235/472.01 |
| 6,015,091 | * | 1/2000 | Rockstein et al. | 235/472.01 |

* cited by examiner

Primary Examiner—Michael G Lee
Assistant Examiner—Uyen-Chau N. Le
(74) Attorney, Agent, or Firm—Kirschstein, et al.

(57) ABSTRACT

Antique identifying electro-optical marker is associated with a base unit having a receiver. During a set-up mode of operation, an electro-optical reader reads the marker. During subsequent reading of indicia, the reader generates electrical signals which are transmitted to the receiver of the uniquely identified base unit.

20 Claims, 18 Drawing Sheets

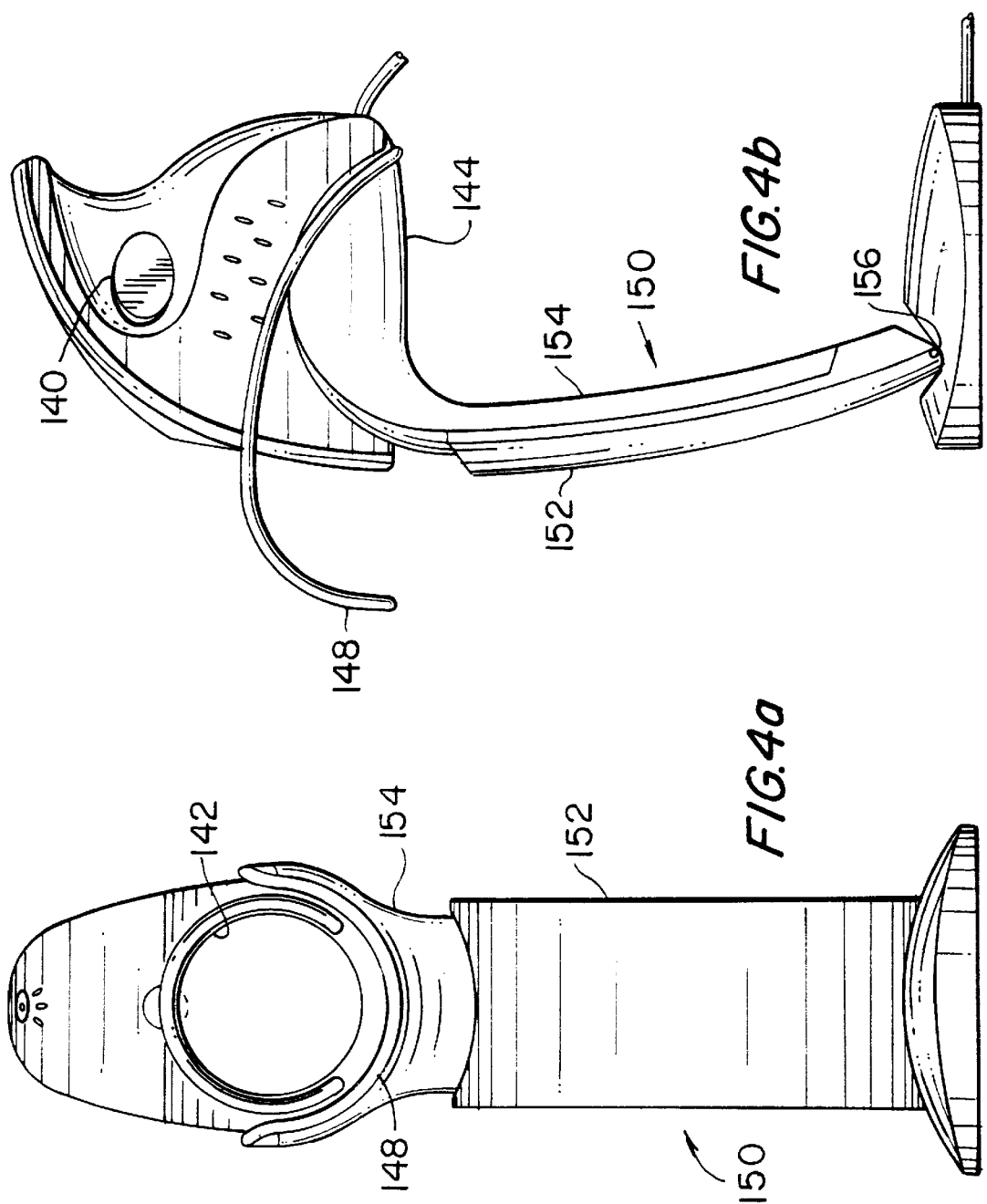

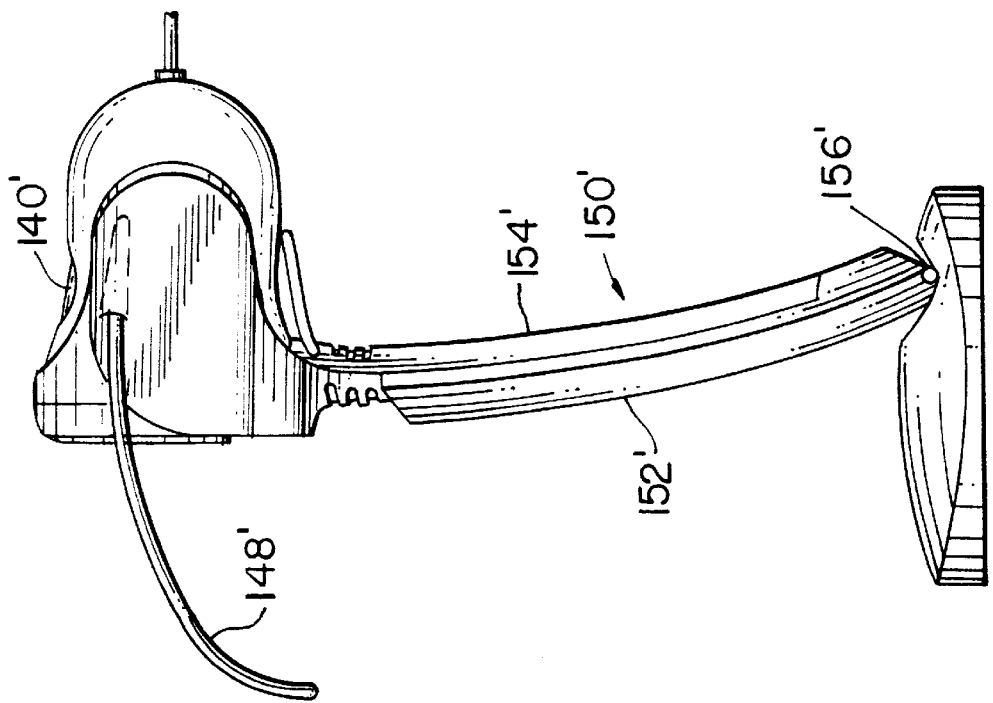
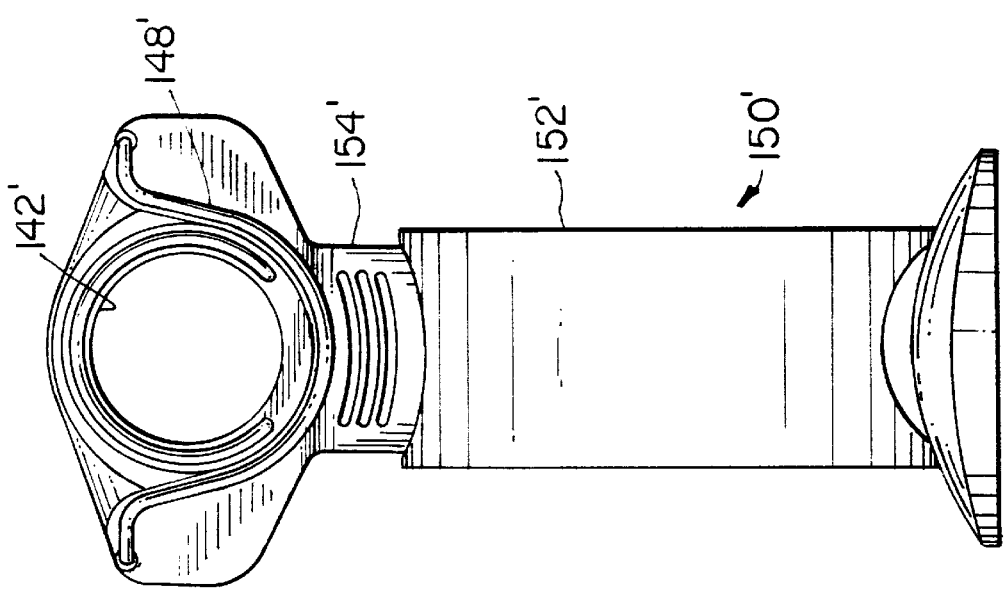

OPTICAL SCANNER WITH HAND-HELD AND HANDS-FREE MODES OF USE

REFERENCE TO RELATED APPLICATIONS

This application is a division of U.S. Ser. No. 08/798,501, filed Feb. 10, 1997, now U.S. Pat. No. 6,053,413 which is a continuation-in-part of co-pending U.S. patent application Ser. No. 08/367,977 filed Jan. 3, 1995.

This application is also a continuation-in-part of Ser. No. 08/642,670, filed May 3, 1996, hereby incorporated by reference, which was a division of U.S. Ser. No. 08/419,916, filed Apr. 11, 1995, which is a division of U.S. Ser. No. 08/028,107, filed Mar. 8, 1993, now U.S. Pat. No. 5,408,081 which is a continuation-in-part of U.S. Ser. No. 721,951, filed Jun. 27, 1991, which is now abandoned, which is a division of U.S. Ser. No. 510,074, filed Apr. 13, 1990, now U.S. Pat. No. 5,059,779, which is a continuation-in-part of U.S. Ser. No. 367,335, filed Jun. 16, 1989, now U.S. Pat. No. 5,124,539.

This application is also related to Ser. No. 08/595,162, filed Feb. 1, 1996, which is a continuation of Ser. No. 08/153,053, filed Nov. 17, 1993, now U.S. Pat. No. 5,504,316.

This application is also related to Ser. No. 08/377,732 filed Jan. 25, 1995.

BACKGROUND OF THE INVENTION

1. Field of the Invention

The invention relates generally to optical scanners, and particularly although not exclusively to scanners for reading bar code symbols. The invention further relates, in its various aspects, to a hand-held scanner of modified spherical or ovoid shape, and to a system for linking a wireless scanner to a particular scanner cradle.

2. Description of Related Art

Various optical readers and optical scanning systems have been developed heretofore for reading indicia such as bar code symbols appearing on a label or on the surface of an article. The bar code symbol itself is a coded pattern of indicia comprised of a series of bars of various widths spaced apart from one another to bound spaces of various widths, the bars and spaces having different light reflecting characteristics. The readers in scanning systems electro-optically transform the graphic indicia into electrical signals, which are decoded into alphanumeric characters that are intended to be descriptive of the article or some characteristic thereof. Such characteristics are typically represented in digital form and untilized as an input to a data processing system for applications in point-of-sale processing, inventory control and the like. Scanning systems of this general type have been disclosed for example, in U.S. Pat. Nos. 4,251,798; 4,369,361; 4,387,297; 4,409,470; 4,760,428; 4,896,026; 5,015,833; 5,262,627; and 5,504,316 all of which have been assigned to the same assignee as the instant application and each of which are hereby incorporated by reference. As disclosed in some of the above patents, one embodiment of such a scanning system resides, inter alia, in a hand held, portable laser scanning device supported by a user, which is configured to allow the user to aim the scanning head of the device, and more particularly, a light beam, at a targeted symbol to be read.

The light source in a laser scanner bar code reader is typically a semiconductor laser. The use of semiconductor devices as the light source is especially desirable because of their small size, low cost and low voltage requirements. The laser beam is optically modified, typically by an optical assembly, to form a beam spot of a certain size at the target distance. It is preferred that the cross section of the beam spot of the target distance be approximately the same as the minimum width between regions of different light reflectivity, i.e., the bars and spaces of the symbol. At least one bar code reader has been proposed with two light sources to produce two light beams of different frequency.

The laser beam may be moved by optical or opto-mechanical means to produce a scanning light beam U.S. Pat. No. 5,144,120 to Krichever et al. employs laser, optical and sensor components mounted on a drive for repetitive reciprocating motion either about an axis or in plane to effect scanning.

Another type of bar code scanner employs electronic means for causing the light beam to scan a bar code symbol, rather than using a mechanical activation. A linear array of light sources activated one at a time in a regular sequence may be imaged upon the bar code symbol to simulate a scanned beam. Instead of a single linear array of light sources, a multiple-line array may be employed, producing multiple scan lines. Such type of scanner is disclosed in U.S. Pat. No. 5,258,605 to Metlitzky et al.

Typically, the semiconductor lasers used in such bar code scanners is an edge-emitting injection laser in which the laser beam is emitted from the p-n junction region on a polished end face of the device. By their physical nature, these known edge-emitting injection lasers emit a beam from a thin region at the p-n junction. A laser beam emanating from a thin source has a large beam divergence which makes focusing difficult and results in a wide range of variability in performance from laser to laser.

A more recently developed form of semiconductor laser is the vertical-cavity surface-emitting laser diode (VCSEL), such as described in "Efficient Room-Temperature Continuous-Wave AlGaInP/AlGaAs Visible (670 nm) Vertical-Cavity Surface Emitting Laser Diodes" by R P Schneider et al. published in IEEE Photonics Technology Letters, Vol. 6, No. 3, March 1994. Reference is also made to U.S. Pat. Nos. 5,283,447; 5,285,455; 5,266,794; 5,319,496; and 5,326,386, which are hereby incorporated by reference, for background information.

The VCSEL has a substantial surface area from which the laser beam is emitted; this area may be patterned. Thus, the beam produced is less divergent in one dimension than with known edge-emitting type semiconductor laser diodes. The output beam is round, and is virtually not astigmatic. Furthermore, VCSELs typically operate at significantly lower currents than edge-emitting laser diodes. Therefore, it also generates less heat.

In the laser beam scanning system known in the art, a single laser light beam is directed by a lens or other optical components along the light path toward a target that includes a bar code symbol on the surface. The moving-beam scanner operates by repetitively scanning the light beam in a line or series of lines across the symbol by means of motion or a scanning component, such as the light source itself or a mirror disposed in the path of the light beam. The scanning component may either sweep the beam spot across the symbol and trace a scan line across the pattern of the symbol, or scan the field of view of the scanner, or do both.

Bar code reading systems also include a sensor or photodetector which detects light reflected or scattered from the symbol. The photodetector or sensor is positioned in the scanner in an optical path so that it has a field of view which ensures the capture of a portion of the light which is reflected or scattered off the symbol, detected, and converted into an electrical signal.

In retroreflective light collection, a single optical component e.g., a rotating mirror, such as described in Krichever et al. U.S. Pat. No. 4,816,661 or Shepard et al. U.S. Pat. No. 4,409,470, both herein incorporated by reference, scans the beam across a target surface and directs the collected light to a detector. The rotating mirror usually is relatively large to receive the incoming light, and only a small detector is required since the rotating mirror can focus the light on to a small field of view, which increases signal-to-noise ratio.

In non-retroreflective light collection, the reflected laser light is not collected by the same optical component used for scanning. Instead, the detector is independent of the scanning beam, and is typically constructed to have a large field of view so that the reflected laser light traces across the surface of the detector. Because the scanning optical component, such as a rotating mirror, need only handle the outgoing light beam, it can be made much smaller. On the other hand, the detector must be relatively large in order to receive the incoming light beam from all locations in the scanned field.

Electronic circuitry and software decode the electrical signal into a digital representation of the data represented by the symbol that has been scanned. For example, the analog electrical signal generated by the photodetector is converted by a digitizer into a pulse or modulated digitized signal, with the widths corresponding to the physical widths of the bars and spaces. Such a digitized signal is then decoded, based on the specific symbology used by the symbol, into a binary representation of the data encoded in the symbol, and subsequently to the alpha numeric characters so represented.

The bar code symbols are formed from bars or elements typically rectangular in shape with a variety of possible widths. The specific arrangement of elements defines the character represented according to a set of rules and definitions specified by the code or "symbology" used. The relative size of the bars and spaces is determined by the type of coding used as is the actual size of the bars and spaces. The number of characters (represented by the bar code symbol) is referred to as the density of the symbol. To encode the desired sequence of the characters, a collection of element arrangements are concatenated together to form the complete bar code symbol, with each character of the message being represented by its own corresponding group of elements. In some symbologies, a unique "start" and "stop" character is used to indicate when the bar code begins and ends. A number of different bar code symbologies exist, these symbologies include UPC/EAN, Code 39, Code 128, Codebar, and Interleaved 2 of 5, etc.

In order to increase the amount of data that can be represented or stored on a given amount of surface area, several new bar code symbologies have recently been developed. One of these new code standards, Code 49, introduces a "two-dimensional" concept by stacking rows of characters vertically instead of extending the bars horizontally. That is, there are several rows of bar and space patterns, instead of only one row. The structure of Code 49 is described in U.S. Pat. No. 4,794,239. Another two-dimensional symbology, known as "PDF417", is described in U.S. Pat. No. 5,304,786.

Still other symbologies have been developed in which the symbol is comprised of a matrix array made up of hexagonal, square, polygonal and/or other geometric shapes. Such symbols are further described in, for example, U.S. Pat. Nos. 5,276,315 and 4,794,239. Such matrix symbols may include Vericode, Datacode, and MAXICODE.

The decoding process of known bar code reading system usually works in the following way. The decode receives the pulse width modulated digitized signal from the digitizer, and an algorithm, implemented in the software, attempts to decode the scan. If the start and stop characters and the characters between them in the scan were decoded successfully and completely, the decoding process terminates and an indicator of a successful read (such as a green light and/or an audible beep) is provided to the user. Otherwise, the decoder receives the next scan, performs another decode attempt on that scan, and so on, until a completely decoded scan is achieved or no more scans are available.

One particular variety of scanner is known as an omni-directional scanner, so called because scanners of this type are capable of reading bar code symbols which are presented to them in any orientation. Typically, an omni-directional scanner may produce a "cross-hatch" type of scan pattern, featuring several sets of parallel lines, each set being angularly spaced from each other set so that the entire 360° is covered. Such cross-hatch patterns are produced by directing a light beam onto a spinning planar or polygonal mirror which scans the beam across a group of stationary mirrors, creating several scan lines. The stationary mirrors are angled with respect to each other, thereby ensuring that the corresponding scan lines are similarly angled.

One particular type of omni-directional scanners known as "presentation" or "projection" scanners is presently available from a number of manufacturers. Typically, these scanners are intended to be used in point-of-sale environments, where items with bar code symbols on them are passed by or presented to the scanner. Examples include the Metrologic MS-700, the Fujitsu Slim Scan 1000, the Spectra Physics Space and the Panasonic ZE-87.

In most point-of-sale environments there is very little room for the scanner, and it is therefore highly desirable for the scanner to be made as small as possible. However, as the scanner is made smaller the scan pattern is made smaller also. This results in a scanner that is not as easy to use, because the operator must be more careful in positioning the bar code symbol to be scanned within the scan pattern. Such positioning must often be done blind, because the scan pattern is normally invisible in normal room lighting, and the scanner is often positioned in any event so that the symbol is not visible to the operator when it is being scanned.

It can clearly be seen, therefore, that it would be desirable to have a scanner which fits into a small package but which creates the largest possible scan pattern. Providing such a scanner is not an easy task, however.

As have been mentioned above, the scan pattern in known scanners is normally generated by a scanning polygonal mirror which scans the laser across a group of stationary mirrors, thereby creating several scan lines. The stationary mirrors are oriented so that the lines reflecting off them converge into the desired scan pattern just outside the exit window of the scanner. Since the size of the scan pattern grows as the distance from the pattern mirrors increases, it will be understood that the further the mirrors are placed behind the exit window the better. However, the further the mirrors are placed behind the window, the deeper the housing has to be to accommodate them.

There is a further design consideration that tends to drive up the thickness or depth of the scanner housing. As stated above, the scan pattern is formed by angling the stationary pattern mirrors so that the lines converge into the desired pattern near to the exit window. The closer the mirrors are to the window, the more steeply the mirrors must be angled to get the lines to converge in the correct place. If the scanner thickness is small, with consequently steeply angled mirrors, the scanning lines will necessarily diverge from the desired pattern rapidly as distance from the window is increased. Accordingly, the pattern decays rapidly farther from the scanner, and the user is thereby forced to bring the bar code symbol up close to the window before recognition will take place.

It will be clear, therefore, that it is thought desirable to have a deep scanner housing so that the mirrors can be placed as far away from the window as possible, so that the pattern will be large at the window, and so that the pattern will remain converged, and useful as a scanning pattern, even as the distance between the window and the bar code symbol increases.

There have been a number of prior art attempts to resolve this conflict between pressure for a deep scanner, to improve performance, and pressure for a narrow scanner, to save space in the checkout area. Some typical prior art solutions are illustrated in FIGS. 9 to 11.

FIG. 9 illustrates a first prior art arrangement in which the scanner housing (or body) 10 is deliberately made narrow, with the distance between a front face 12 and a rear face 14 of the body being only about 1.75 inches (4.4 centimeters). A light beam generated by a laser 16 is shone onto a rotating polygonal mirror 18 which is caused to rotate by a motor 20. The light reflected back from the polygonal mirror 18 impinges upon a plurality of stationary pattern mirrors 22, which direct the light out of the housing 10 via a window 24.

With this arrangement, the stationary mirrors 22 are positioned immediately behind the exit window 24. This results in a slim overall package, but has the disadvantage that the scan pattern does not become good (that is the scan lines do not cross each other) until they have projected a few inches beyond the scanner. This reduces scanner flexibility and performance, because users frequently hold the symbol near to the window. With the arrangement shown in FIG. 9, it is quite possible to move the symbol past the scanner, close to the window, and never to intercept a scan line that is properly oriented to read the presented symbol.

A further prior art arrangement is shown in FIG. 10. In this arrangement the housing 26 is generally smaller than the housing shown in FIG. 9, but is somewhat deeper, with the distance between a front face 42 and a rear face 44 being about 4 inches (10 centimeters). A laser 28 produces a light beam which impinges, in order, on a first fold mirror 30, a second fold mirror 32, a spinning mirror 34 which is actuated by a motor 36, and a series of stationary pattern mirrors 38. The light is then reflected from the pattern mirrors out of the housing 26 through a window 40.

This arrangement again produces a pattern which is not well formed until about 2.5 inches (6.4 centimeters) from the window, but uses frequently hold symbols closer than this. The small overall size of the housing means that the scan pattern is likewise small, and it is relatively easy for the user to miss the pattern entirely when he brings up a bar code symbol into what he believes to be the correct position.

FIG. 11 shows an improvement on these prior art embodiments. This scanner is contained within a housing 44 which is about 3 inches (7.6 centimeters) in depth between a front surface 46 and a rear surface 48. The length and width dimensions are both about 6.5 inches (16.5 centimeters). A laser 50 produces a light beam which impinges, in order, on a fold mirror 52, a spinning polygonal mirror 54 actuated by a motor 56, and a series of stationary pattern mirrors 57. The light is reflected from these pattern mirrors 57 out of the housing 44 via a window 58.

This arrangement still produces a pattern which is not fully formed at the window. Furthermore, the pattern is of necessity relatively small compared with the overall size of the front face 46 of the housing. In one commercially available embodiment, the window 56 only covers about half of the area of the face 46.

It is another disadvantage for each of the arrangements described above that none is particularly well configured for use when the scanner window is vertical, or nearly vertical, as is becoming popular in warehouse stores and some supermarkets. In such a situation, it is important for the scan pattern to project close to the counter-top, as well as several inches above the counter-top, so that the scan pattern cannot miss a symbol even if it is very close to the counter-top on the side of the package near the scanner. Current scanners, such as those described above, normally have to be partially buried within the counter-top, which of course is expensive. An alternative is to position the scanner on top of the counter-top, but that means that the user may have to lift the item to ensure that the symbol intercepts the scan pattern. That is of course also undesirable, as it produces user fatigue.

Turning now to the embodiments of a system for linking a wireless scanner to a particular scan cradle, it is believed that the closest prior art is represented by U.S. Pat. No. 5,189,291, to Siemiatkowski. U.S. Pat. No. 5,448,046 to Swartz and U.S. Pat. No. 5,151,581 to Kirchever et al are examples of documents showing adjustable stands. All of these patents have been assigned to the present assignee.

SUMMARY OF THE INVENTION

Objects of the Invention

It is a general object of the present invention to advance the art of scanners for reading indicia of differing light reflectivity, particularly although not exclusively, laser scanners for reading bar code symbols.

A further object is to provide a hand-held scanner of a convenient ergonomic shape.

A further object, in at least some embodiments, is to provide a wireless-based system requiring fewer portable scanners than base units, and providing greater flexibility for the users.

Yet a further object, in at least some embodiments, is to provide a convenient mechanism for altering the focus and/or cross-section of the laser beam according to the type of indicia to be scanned.

A further object of the present invention, in at least some embodiments, is to provide a compact scanner in which the scanning pattern is fully formed at or at least close to the window.

It is yet a further object, in at least some embodiments, to provide a compact scanner in which the scanning pattern is large in comparison with the front face of the scanner.

It is yet a further object, in at least some embodiments, to provide a scanner which is suitable for use with the window vertical, whereby items to be scanned are slid past the scanner. A further object is to provide such a scanner which does not need to be partially buried in the counter-top for optimal efficiency.

Features of the Invention

According to a first aspect of the invention there is provided a hand-held optical scanner having a housing generally of flattened part-spherical shape, the housing having a generally flat forwardly-directed window; and a light source and scanning device within the housing for directing a scanning light beam through the window toward an indicia to be scanned.

According to a further object, there is provided an optical scanning system comprising:

(1) A portable hand-held scanner having a light source and scanning device for directing a light beam toward an indicia to be scanned;

(2) A scanner stand having a cradle portion for cradling the scanner, and a cradle-support portion, the cradle-support portion being manually adjustable to enable the scanner to be held securely by the cradle-portion in any one of an infinite number of positions;

whereby the scanner is operable in both a hand-held mode, and in a hands-free mode mounted by the cradle portion of the stand.

According to a further object there is provided an optical scanning system comprising:

(1) A portable hand-held scanning having a light source, a scanning device for directing a light beam toward an indicia to be scanned, and a radio transmitter for transmitting information relating to scanned indicia;

(2) A base unit including a radio receiver for receiving said transmitted information from the hand-held scanner; and (3) A machine-readable indicia associated with the base unit for uniquely identifying the base unit, when the indicia is scanned by the light beam, to the scanner.

According to a further object there is provided a method of operating an optical scanning system, the system comprising:

(1) A portable hand-held scanner having a light source, a scanning device for directing a light beam toward an indicia to be scanned, and a radio transmitter for transmitting information relating to scanned indicia;

(2) A base unit including a radio receiver for receiving said transmitted information from the hand-held scanner; wherein the method comprises using the hand-held scanner to scan a machine readable indicia associated with the base unit, thereby uniquely associating the base unit with the scanner, and transmitting information relating to subsequently-read indicia by wireless communication from the radio transmitter of the scanner to the radio receiver of the base unit.

According to a further object there is provided a laser diode assembly comprising:

(a) a laser diode for producing a laser beam;

(b) first focusing optics for shaping the laser beam;

(c) an aperture member defining a first beam aperture; and (d) a movable member defining a second beam aperture, of a different shape from said first beam aperture, and movable into and out of the beam, whereby the beam may selectively be stopped by said first beam aperture or by said second beam aperture.

The invention also extends to a scanner including a laser diode assembly as previously defined.

According to another aspect of the present invention there is provided an optical scanner comprising:

(a) a housing;

(b) a window in the housing;

(c) a light-emitter for producing a light beam;

(d) a beam scanner for scanning the light beam;

(e) a plurality of pattern-producing mirrors which are arranged to reflect the scanning light beam in a direction generally away from the window and to create thereby a scanning pattern; and (f) a further mirror arranged to reflect the scanning pattern and to direct it out of the housing via the window.

According to a second aspect of the present invention there is provided an optical scanner comprising:

(a) a housing having a front face and a rear face;

(b) a window in the front face of the housing;

(c) a laser for producing a light beam;

(d) a beam scanner for scanning the light beam;

(e) a plurality of pattern-producing mirrors which are arranged to reflect the scanning light beam towards the rear face of the housing, and to create thereby a scanning pattern; and (f) a further planar mirror, positioned adjacent the rear face of the housing, and arranged to reflect the scanning pattern and to direct it out of the housing via the window.

Such an arrangement provides a long optical path within the scanner by reversing the normal orientation of the mirrors with respect to the exit window. In the preferred embodiment of the present invention, the scan lines are directed from the mirrors towards the back of the housing, where they are reflected from a further large planar mirror out of the exit window. This approximately doubles the path length within the housing as compared with the arrangement shown in FIG. 11, and almost quadruples it compared with the arrangement shown in FIG. 9.

With the embodiment shown, the scan pattern produced is believed to be the largest, compared with the housing size, of any known omni-directional scanner. The scan pattern fills almost the entire front surface of the scanner housing. Preferably, the exit window also fills almost the entire front surface of the scanner housing, and the scan pattern fills almost the entire area of the window. In particular preferred embodiments, the window may take up 90%, 80%, 70% or 60% of the area of the front surface of the scanner housing.

This configuration is also highly advantageous when the scanner is to be used, at the point-of-sale, by sliding items marked with symbols past the scanner, the scanner window being vertical or nearly vertical. In this situation, it is an advantage of the present invention that the scan pattern projects close to the counter-top, as well as several inches above the counter-top, so that the scan pattern cannot miss a symbol even if it is very close to the counter-top on the side of the package near the scanner. This obviates the need either for the user to have to lift each item, to ensure that the scan pattern is intercepted, or alternatively to partially bury the scanner within the counter-top.

The preferred scanner is an omni-directional scanner, for example a scanner in which the scan pattern comprises a plurality of scan lines which are equally spaced about a 360° circumference.

The light emitting means is preferably a laser, desirably a laser diode or a VLD (visible laser diode).

The beam scanner means desirably comprises a rotating or oscillating mirror or mirrors, for example a polygonal mirror. Alternatively, however, it could comprise a rotating or oscillating optical means of any other type, such as a lens. In a further possibility, the beam scanner means could directly scan the beam which is emitted by the light emitting means, for example by oscillation of the laser, instead of by reflection of a beam which is initially stationary.

The scanner of the present invention may take a number of forms, including a hand-held scanner, a stationary (fixed) scanner, and a scanner which can optionally be used as a hand-held scanner, but which also has a hands-free mode.

Any of the scanners of the present invention may be configured for communications with a remote base unit, either by means of a wire or by means of a wireless connection. Any convenient communications protocol could be used, including, in the wireless case, frequency-hopping systems. It is also envisaged that full internet connectivity may be provided, for example using the TCP/IP communications protocols.

The scanners of the present invention may conveniently be battery operated, and may have associated with them a charging stand. When the user has finished with the portable scanner, he or she merely places it back into the stand. Contacts on the stand touch corresponding contacts on the scanner to provide automatic recharging of the internal battery back.

The novel features which are considered as characteristic of the invention are set forth in particular in the appended claims. The invention itself, however, both as to its construction and its method of operation, together with additional objects and advantages thereof, will best be understood from the following description of a specific embodiment, when read in conjunction with the accompanying drawings. It is to be understood that the invention may be carried into practice in a number of ways, and the described embodiment is not intended to be limiting.

BRIEF DESCRIPTION OF THE DRAWINGS

FIGS. 4a and 4b are respectively front and side views of an alternative hand-held scanner, according to an embodiment of the present invention, in place in its cradle;

FIGS. 5a and 5b are respectively front and side views of yet another embodiment, in place in its cradle;

DETAILED DESCRIPTION OF THE PREFERRED EMBODIMENT

Figure 1A:
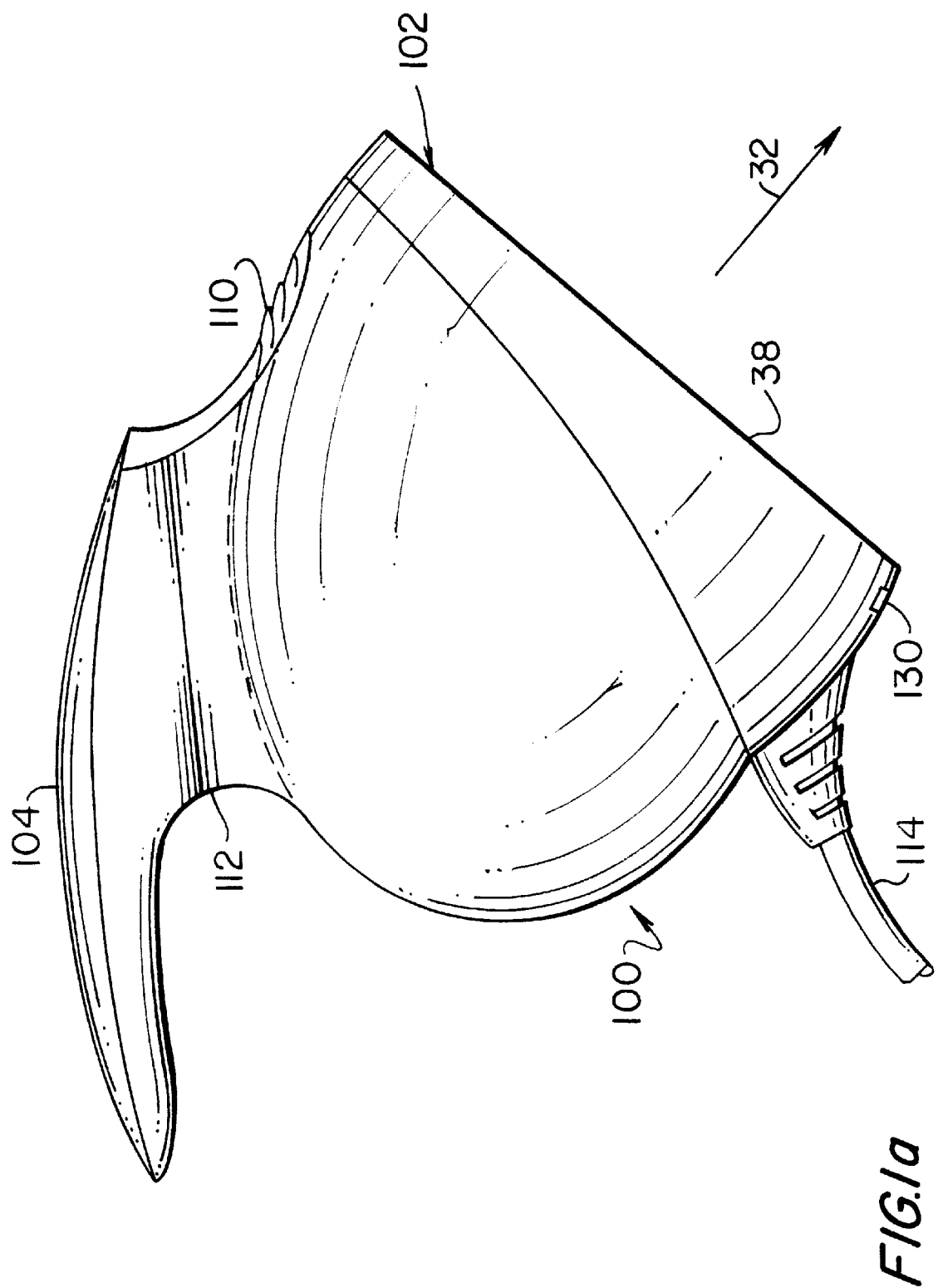
FIG. 1a is a side view of a modified spherical or ovoid hand-held optical scanner according to a preferred embodiment of the present invention.
Figure 1B:
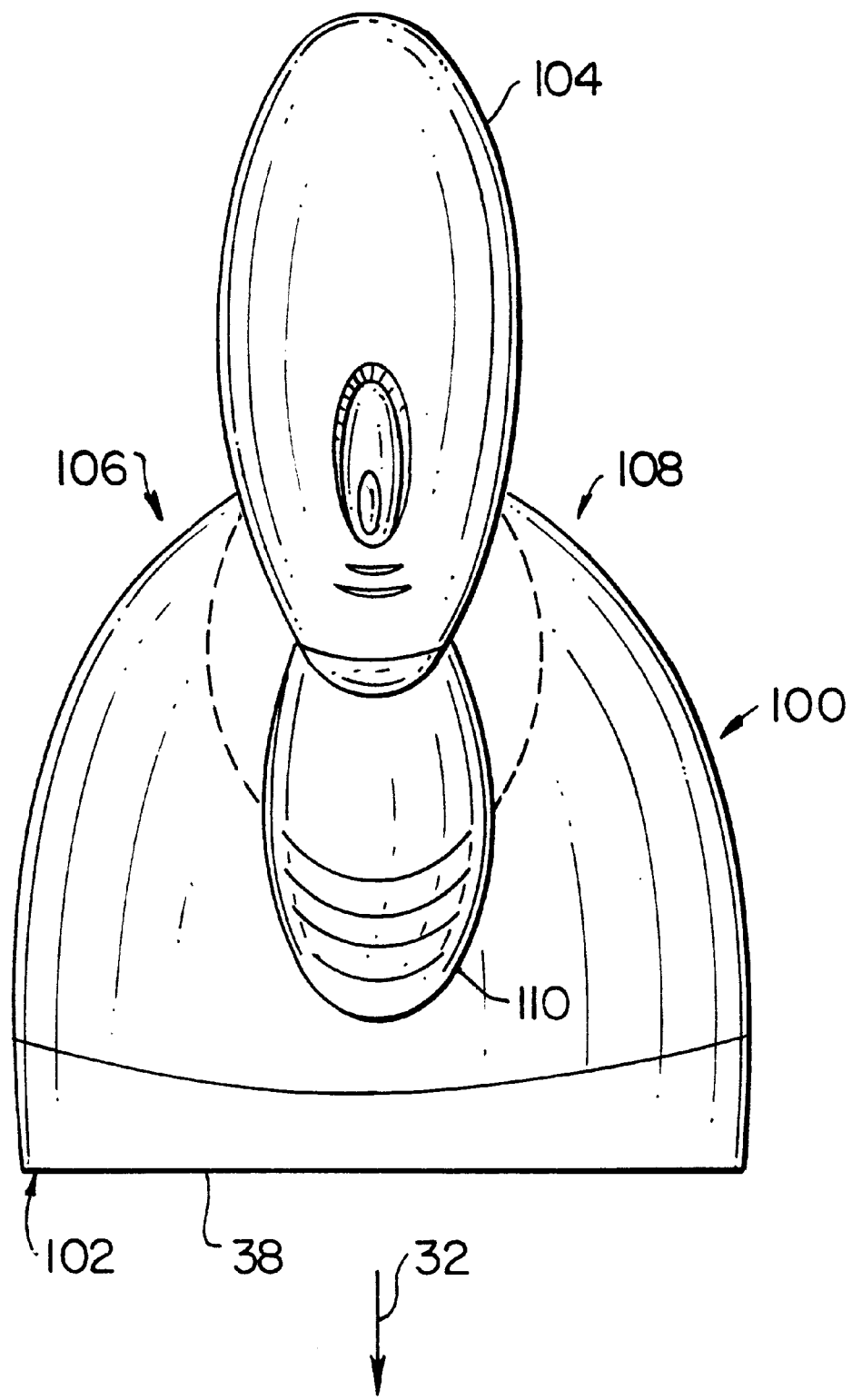
FIG. 1b is a top view of the scanner of FIG. 1.

FIGS. 1a and 1b show a hand-held optical scanner according to a first aspect of the present invention. As may be seen in those figures, the scanner housing 100 is of a shape perhaps best described as modified (flattened) spherical or ovoid. It could also be described as being the shape of a squashed softball. A diagonal flat face 102 of the housing has, within it, a window 38 from which emerges in use a scanning light beam 32. Light reflected from the bar code symbol or other indicia being read passes back through the window 38 and is detected by a photodetector, as will be described in more detail below.

On the upper part of the ovoid body 100 is a rearwardly-extending hydrofoil shaped structure or wing 104, which is preferably molded of a plastics material integrally with the main body 100. On the upper part of the body 100, immediately forward of the wing 104 is a switch or trigger 110.

Figure 2A:
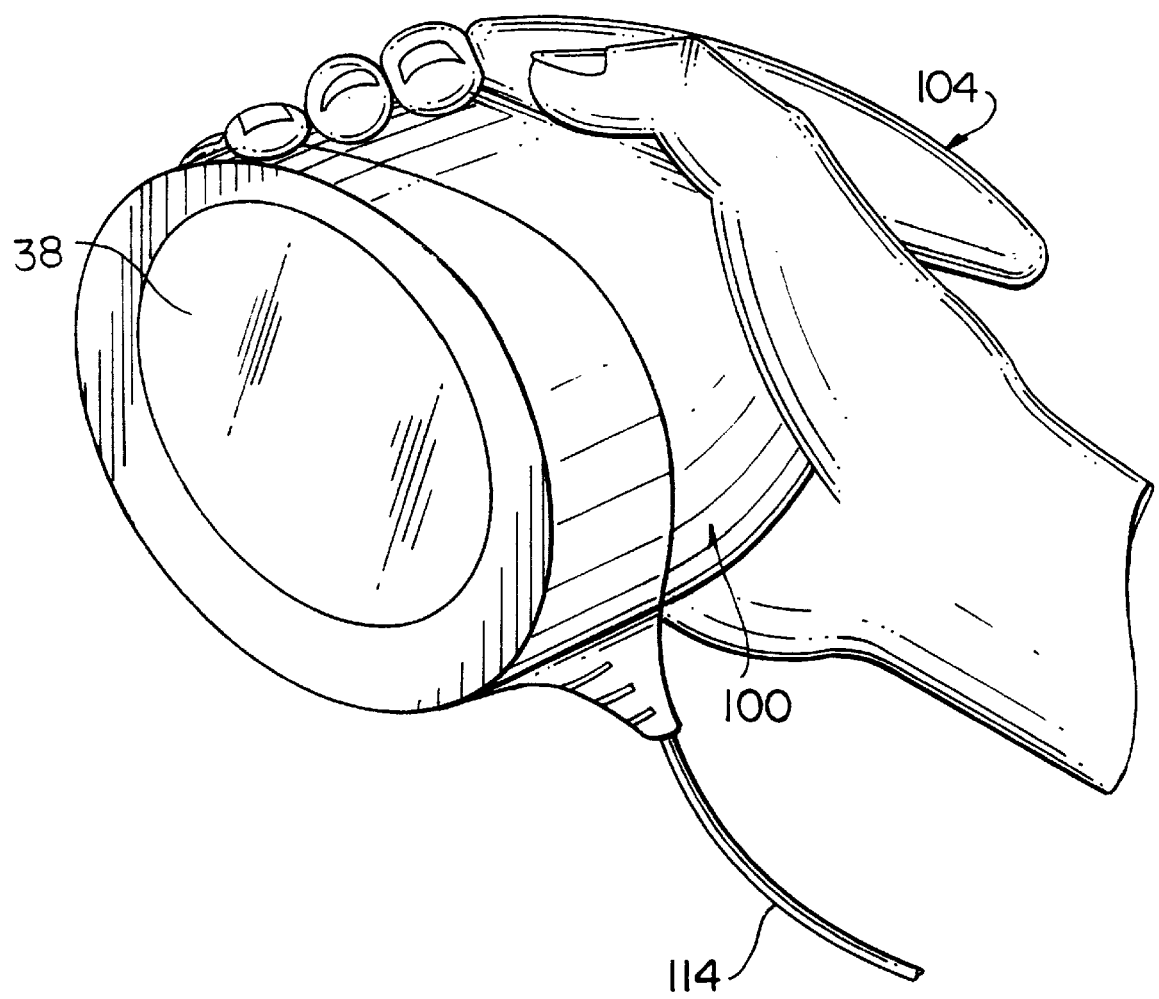
FIGS. 2a and 2b show the scanner of FIG. 1 in use.
Figure 2B:
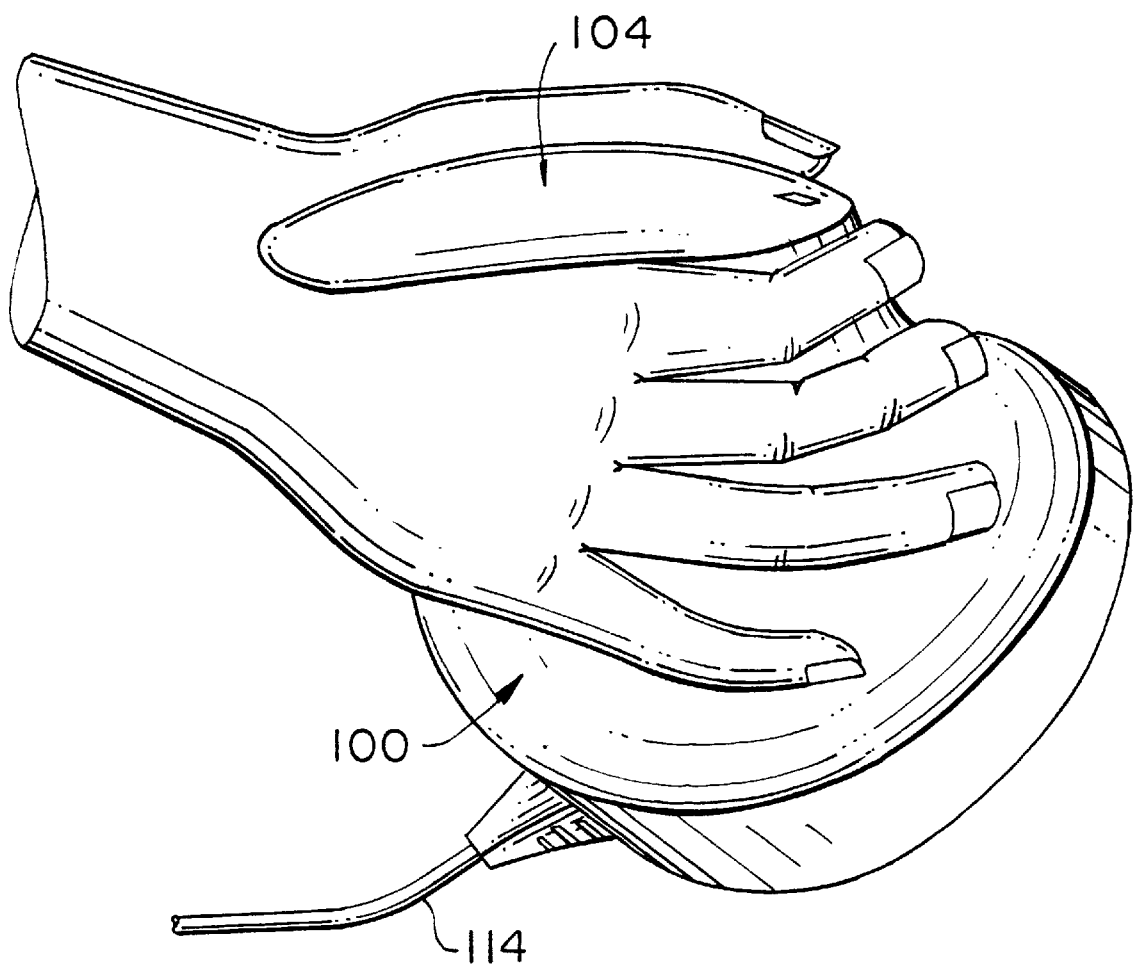

The body 100 is of a size convenient to be held within a user's hand; typically, it may be about 4 inches (10 centimeters) in diameter, measured along the length of the flat front surface 102. In use, as may best be seen in FIGS. 2a and 2b, the user grasps the body 100 in his or her hand, with the thumb passing to one side of the wing 104 and the fingers to the other side. When grasped by a right-handed person, the thumb grasps in the direction of the arrow 108 in FIG. 2, and the fingers in the direction of the arrow 106. The flesh between the thumb and first finger abuts a valley portion 112 at the rear of the wing. In this position, the user can operate the trigger 110 with his or her fingers. It will be noted that the device is symmetrical, and so is equally usable for left-handed and right-handed users.

In use, pressure on the trigger 110 causes scanning to commence. Information received from reflected light is passed on for further processing along a downwardly and rearwardly-directed lead 114. Further details of one preferred scanning mechanism, within the body 100, will now be described with reference to FIG. 15.

Figure 15:
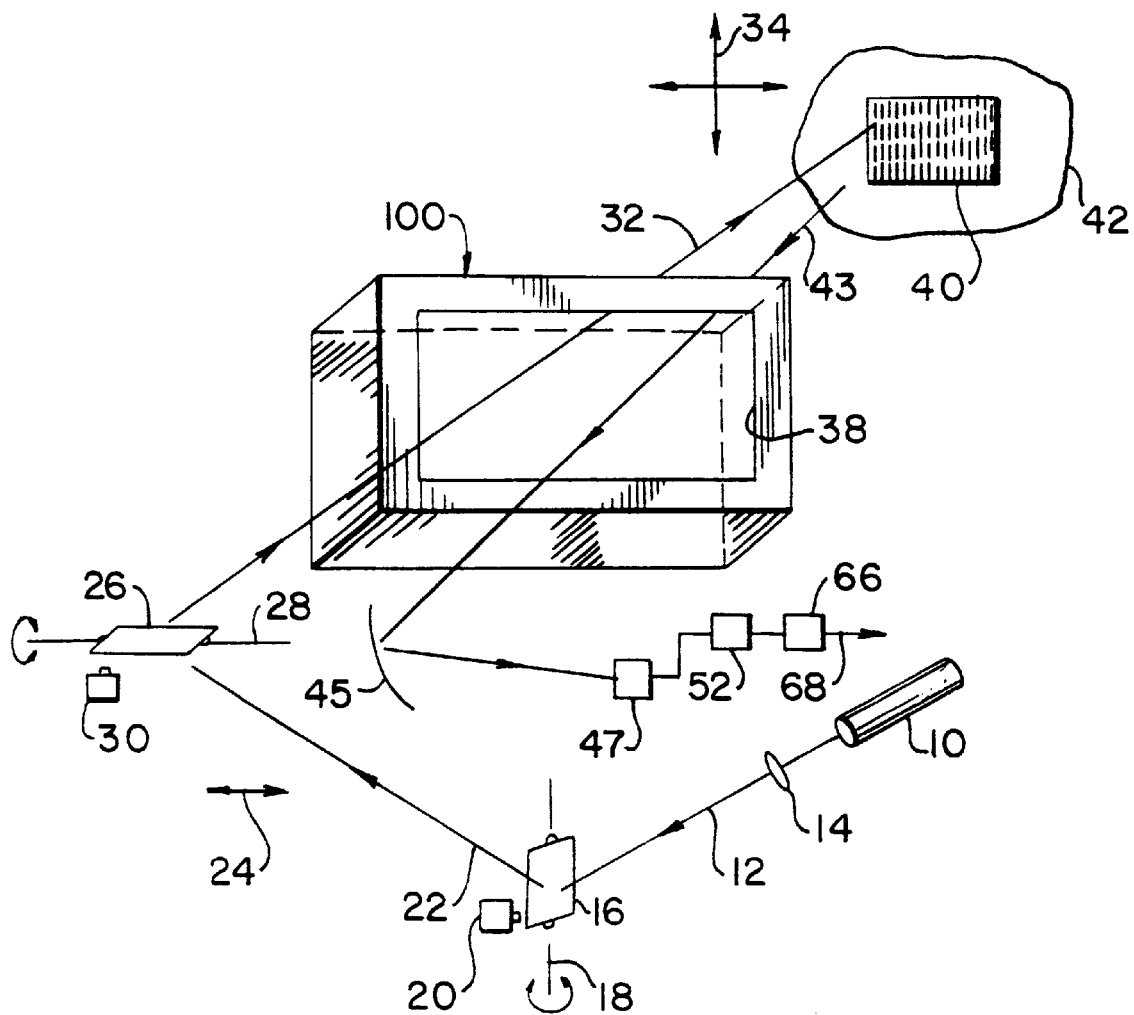
FIG. 15 shows one exemplary internal arrangement for the various scanners shown in FIGS. 1 to 7.

In the preferred internal arrangement, shown in FIG. 15, a laser 10 produces a beam 12 which is conditioned by optical elements 14 before impinging upon a first scanning mode 16 which is arranged to oscillate about a vertical axis 18 by means of a first motor 20. The oscillation of the mirror 16 causes the reflected beam 22 to scan back and forth in the X direction as is indicated by the arrows 24. The scanning beam 22 then impinges on a second scanning mirror 26, this mirror being arranged to oscillate about a horizontal axis 28 by means of a second motor 30. It will be understood that the combined oscillation of the mirrors 16, 26 creates a reflected beam 32 which scans in both the X and Y directions, as indicated by the arrows 34. The mirrors 16, 26 may be mounted for oscillation in any convenient manner.

The beam 32 leaves the housing 100 via the window 38. Although this is shown as rectangular in FIG. 15, in the specific embodiment of FIG. 1, the window is preferably circular. The beam then impinges upon a two-dimensional bar code symbol or other indicia 40 which has been printed onto or otherwise secured to a substrate 42. The indicia 40 may be any type of image that has to be captured by the scanner. It will be appreciated that many types of one-dimensional or two-dimensional symbols could be read with the present system, for example bar code symbols according to the PDF 417 symbology. Other types of two-dimensional images, such as signatures, may also be captured. In embodiments in which one-dimensional symbologies are to be captured, for example bar code symbologies such as Code 39, Code 93, Code 128, Code 2 of 5, UPC and so on, only one of the scanning mirrors 16,26 would be needed.

Light 43 which has been reflected from the indicia 40 passes back through the window 38 and impinges upon a collecting mirror 45 which focuses it onto a photodetector 47.

By suitable control of the amplitude and relative phase of the oscillations of the mirrors 16, 26, the beam 32 may be made to trace out an appropriate desired pattern in two-dimensions across the indicia 40. Typically, the desired pattern will be a raster scan pattern, comprising a series of generally parallel horizontal (X-axis) scan lines which are defined by the first mirror 16, spaced along the vertical (Y-axis) by an amount which is defined by oscillation of the second mirror 26. Alternatively, by appropriate control of the two mirrors, other two-dimensional patterns may be created. Examples include Lissajous figures, or the scanning patterns shown in FIGS. 14*a*, 14*b* and 14*c*.

Signals from the photodetector 47 are passed to a digitizer 52 and then to a decoder 66. The signals from the decoder 66, along the line 68, represent high-level decoded information (text or numbers) corresponding to the information originally coded by the bar code symbols 40. Depending upon implementation, either or both of the digitizer 52 and the decoder 66 may reside outside the scanner body 100, for example in a base unit or stand.

Figure 3:
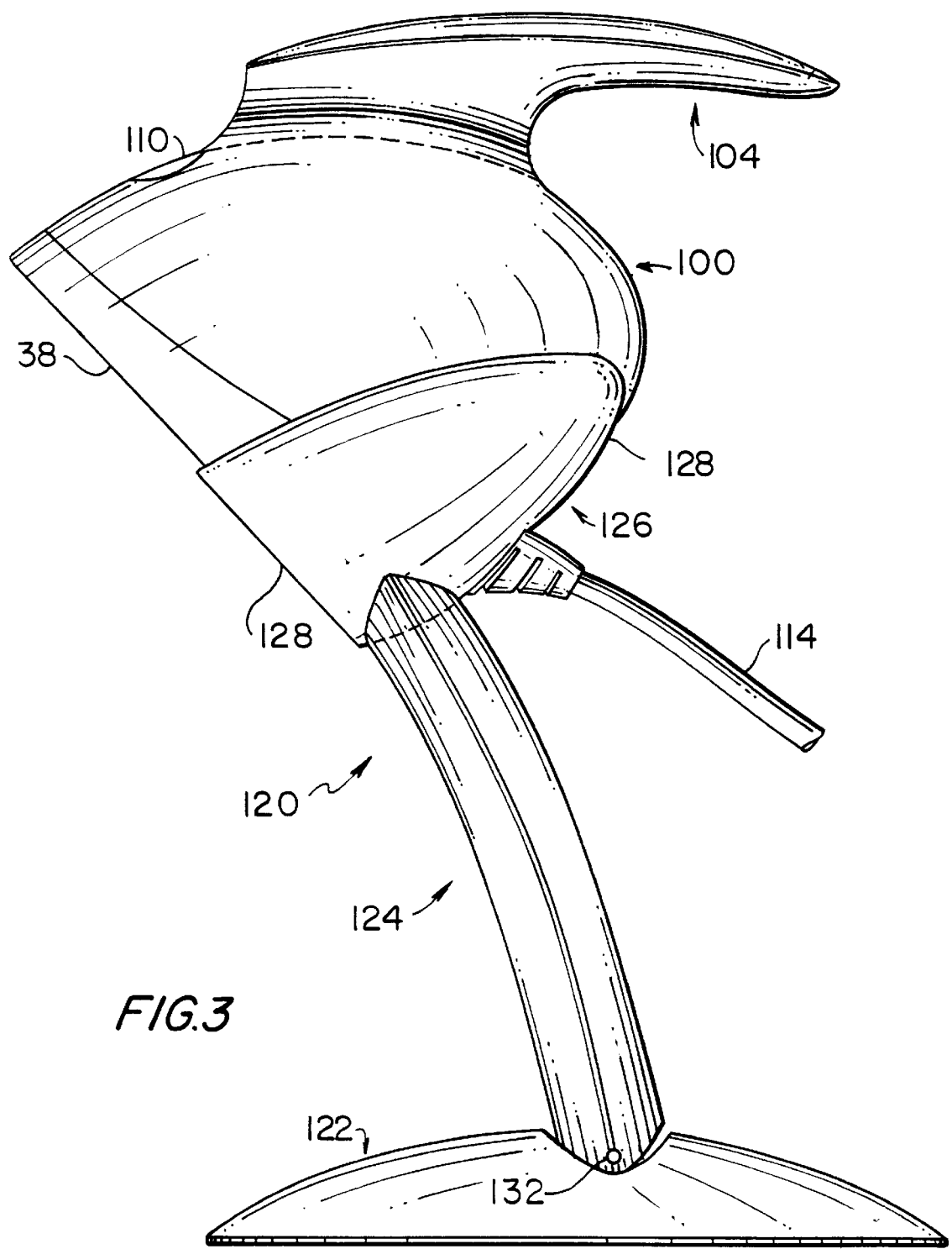
FIG. 3 shows the scanner of FIG. 1 in its cradle.

FIG. 3 shows the scanner of FIGS. 1 and 2 mounted for hands-free operation in its stand 120. The stand 120 comprises a base portion 122, suitable for positioning on a desk or other flat surface, a stalk 124 and a support cradle 126. The cradle 126 has a split rear section 128, to receive the lead 114, and an open area 128 at the front so as to avoid blocking the scanner window 38.

In the position shown, the scanner may be operated in a hands-free mode, either by making use of the trigger 110, or alternatively by providing for automatic operation of the scanner when it senses it has been placed within the cradle 126. To that end, the scanner may incorporate a detector or microswitch 130 (FIG. 1)

The user may adjust the position of the scanner by rotating the stalk about its pivot axis 132 on the base 122. Sufficient friction is provided at the pivot axis 132 so that the cradle and scanner remain in any desired position. Once placed in a convenient position, the user may scan a succession of items merely by passing them in front of the scanner window 38. If an item has to be scanned which cannot conveniently be positioned in front of the scanner, the user simply lifts the scanner from the cradle, takes the scanner to the item in question, and returns it once the scan has been completed.

FIGS. 4*a* and 4*b* show an alternative embodiment of the scanner and stand. In this embodiment, the scanner is actuated by a thumb-operated trigger 140, causing a scanning beam to be emitted via circular window 142 in the housing. Again, the scanner may be operated in a hand-held mode, or in a hands-free mode positioned, as shown, in its cradle 144. To assist in the positioning of indicia to be read, when the scanner is used in the cradle, the cradle is provided with a wire spacer 148. By positioning a bar code to be read up against the spacer, the user may ensure that it is at an optimal distance from the window 142.

The embodiment of FIG. 4 includes a stalk 150 which is in two sections: a front section 152 and a rear section 154. The rear section may be slid upwardly with respect to the front section, thereby effectively extending the length of the stalk. There is sufficient friction between the two parts of the stalk to ensure that the parts will remain in any desired position. Likewise, there is sufficient friction at the pivot point 156 to ensure that the stalk may be positioned at any desired angle.

Yet a further embodiment is shown in FIGS. 5*a* and 5*b*. Similar parts to those shown in FIGS. 4*a* and 4*b* are represented by the same reference numerals, with the addition of a prime.

All of the embodiments so far discussed communicate with a base unit (not shown) via a data lead such as the lead 114 in FIG. 1. However, communication could equally well be by wireless transmission. Alternatively, the scanners shown could include their own data stores (for example in RAM), allowing the lead 114 to be dispensed with. In such an arrangement, the information stored in the RAM would automatically be downloaded into the base unit when the scanner is returned to its cradle.

Figure 6B:
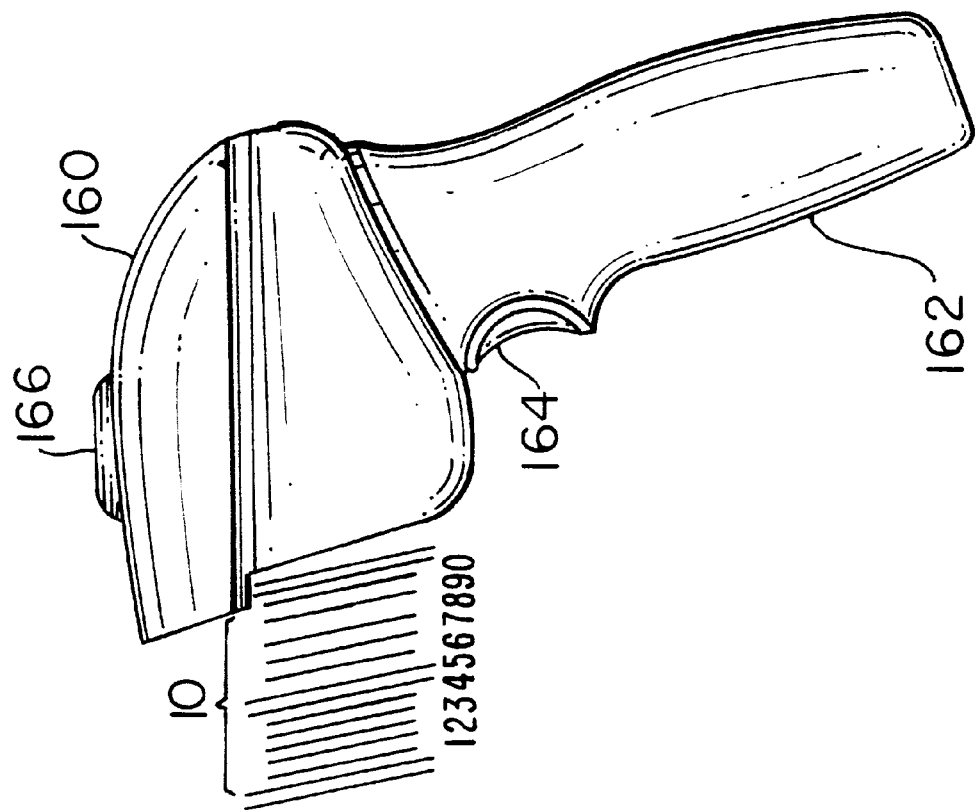
FIGS. 6a and 6b are front and side views of a wireless hand-held scanner.
Figure 6A:
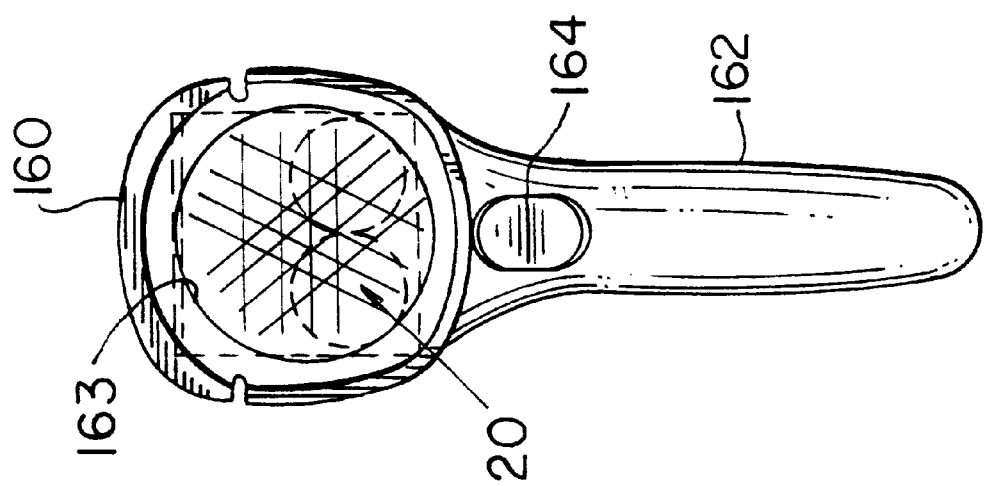
Figure 7:
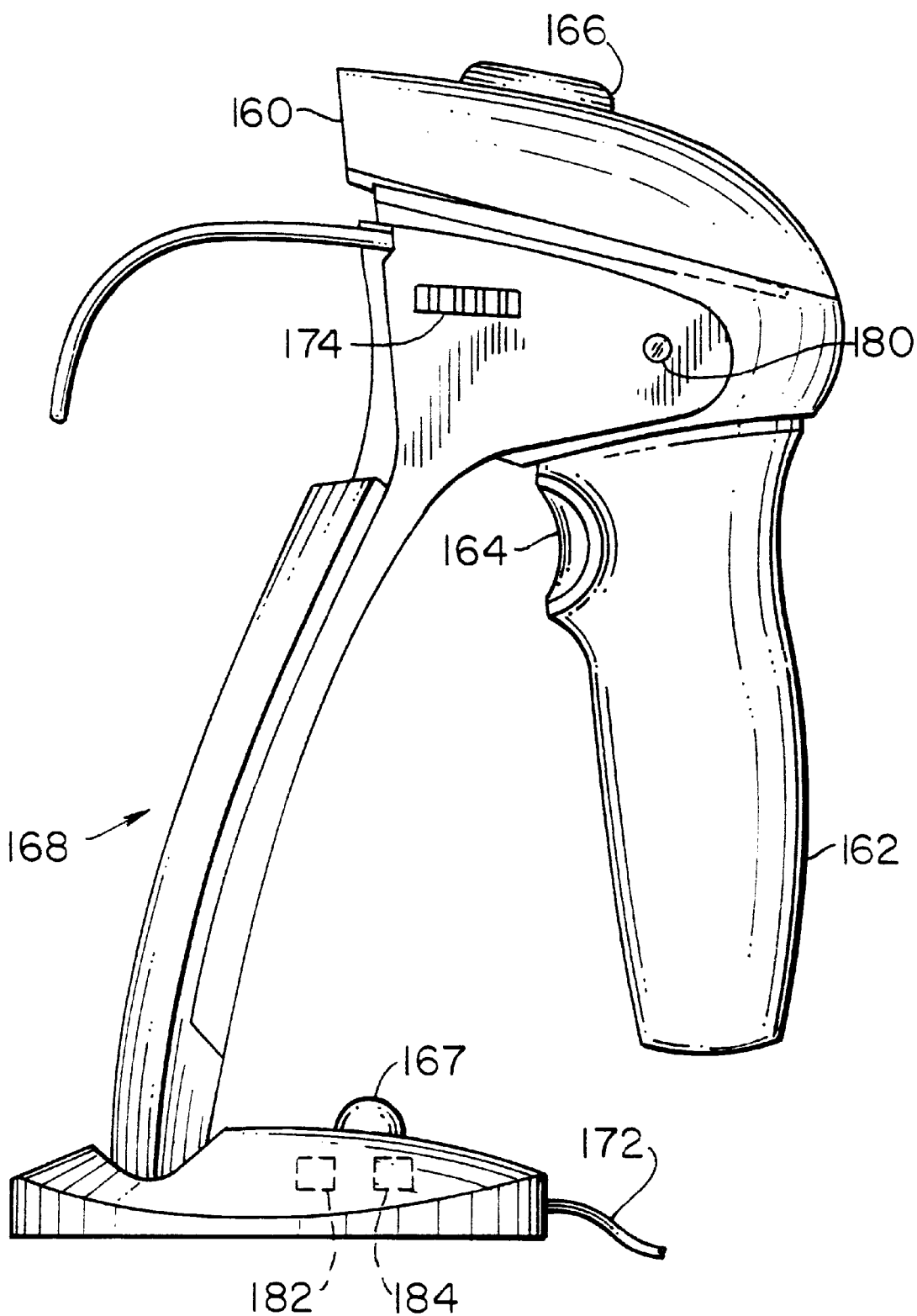
FIG. 7 shows the scanner of FIG. 6 in place in its cradle.

FIGS. 6*a* and 6*b* show an alternative hand-held portable scanner which is arranged to communicate with a base unit by wireless transmission. The scanner has a head portion 160 and a user-graspable handle portion 162 having a trigger 164. Wireless communication is effected by means of a radio transmitter/receiver 166, which is arranged to communicate with a corresponding radio base unit 167 on a stand 168 (FIG. 7). In use, the scanner communicates with the base unit, which passes information on via wires 172 to a central computer (not shown) for further analysis.

In a busy retail or commercial environment there may be many identical scanners and many identical base units, all in operation at once. Traditionally, each scanner is permanently associated with its own individual base unit. In the embodiment of FIG. 7, however, there is no initial association between the scanner and base unit. A user wishing to perform scans near a particular base unit simply picks up any available scanner from the pool of scanners, and commences scanning operations by first scanning a bar code symbol 174 which has been secured to or printed onto the side of the cradle. The scanner stores and/or processes identification information contained within the symbol. Each cradle/base unit has its own individual bar code symbol, so by scanning the symbol, the user is creating a one-to-one link between scanner and base unit. The operator may now go away from the base unit with the scanner and scan the products as desired. On a successful scan, the radio transmitter 166 sends a message to the receiver 167 on the base unit. The base unit has its own internal processor 182 and decoder 184. If the decoder determines that the scan can be understood, a small loudspeaker 180 in the cradle is actuated, to produce an appropriate "beep". The "beeps" of different base units may have different tones, so that operators can distinguish them if several scanners are in use at once.

In linking a scanner to an individual base unit or cradle only when required, the retailer or system owner need not necessarily maintain the same number of scanners as base units. With such an arrangement, the number of scanners required is not determined by the number of base units, but the number of users that are likely to wish to undertake scanning operations at any one time. The pool of uncommitted scanners has a number of further advantages, including lower maintenance overheads, and the possibility for each user to select a scanner of his or her choice. That may be advantageous if for example some users find it easier to operate one particular model of scanner, and others find it easier to use a different model.

It will be understood that although in FIG. 7 the bar code symbol 174 is shown secured to the side of the cradle, the exact position is in fact immaterial. The bar code symbol could be placed elsewhere on the stand 168, or even elsewhere on the nearby desk, worksurface or checkout station. All that is required is for the symbol 174 to be physically associated in some way, for instance by proximity, with the stand or base unit 168.

The scanner of FIG. 6 may be adapted to scan either one-dimensional or two-dimensional indicia. It may incorporate any conventional one or two-dimensional scanning mechanism, such as illustrated in FIG. 15, and may have any convenient one or two-dimensional scanning pattern such as those illustrated in FIGS. 14a, 14b and 14c. The stand or base unit 168 may be of a convenient type, such as any of the stands illustrated in FIGS. 3 to 5. Any other type of stand could of course be used, such as that shown in FIG. 20 of U.S. Pat. No. 5,504,316, assigned to the present assignee. The teaching of that patent are incorporated herein by reference.

Figure 8:
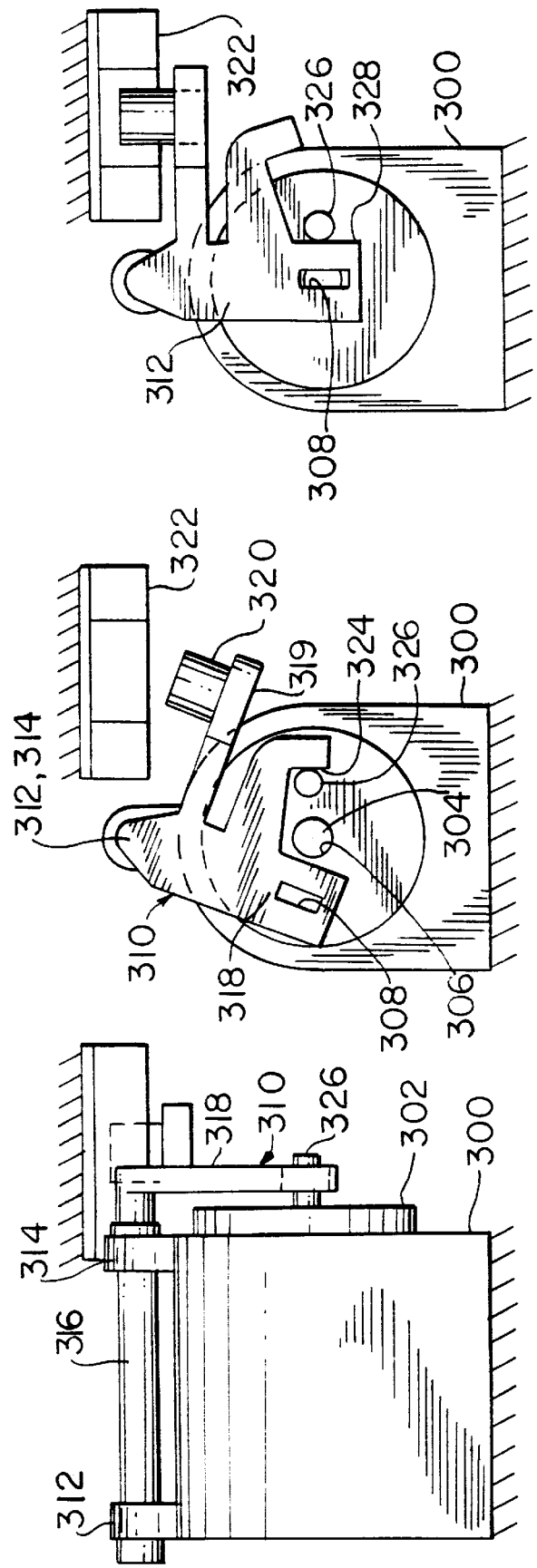
FIG. 8a is a side view of a mechanism for changing the laser aperture.
FIG. 8b is a front view of the mechanism shown in FIG. 8a, with the alternative aperture retracted.
FIG. 8c corresponds to FIG. 8b, but shows the alternative aperture in place.
Figure 9:
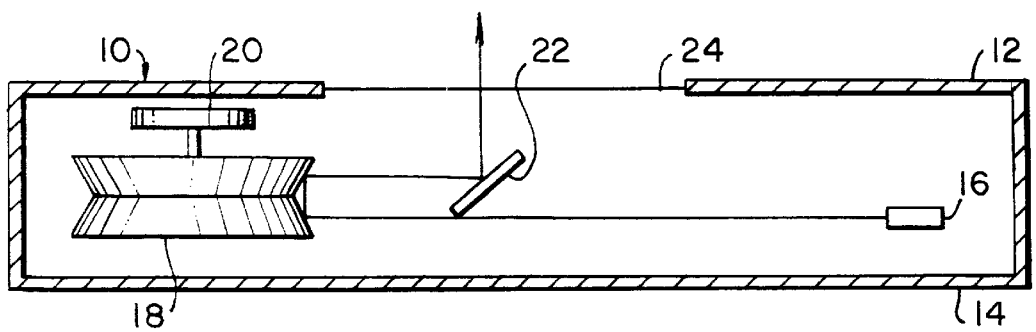
FIG. 9 is a schematic view of a first prior art arrangement, previously described.
Figure 10:
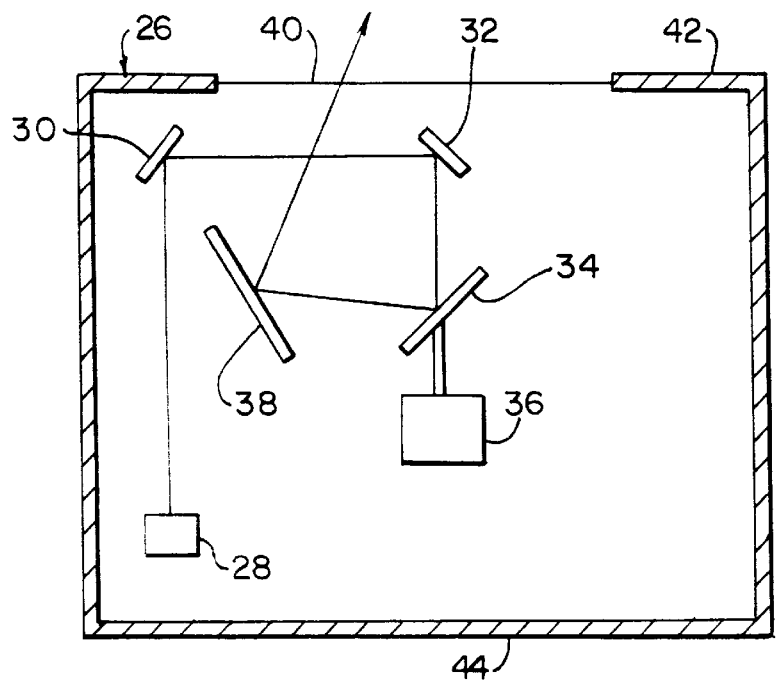
FIG. 10 is a schematic view of a second prior art arrangement, previously described.
Figure 11:
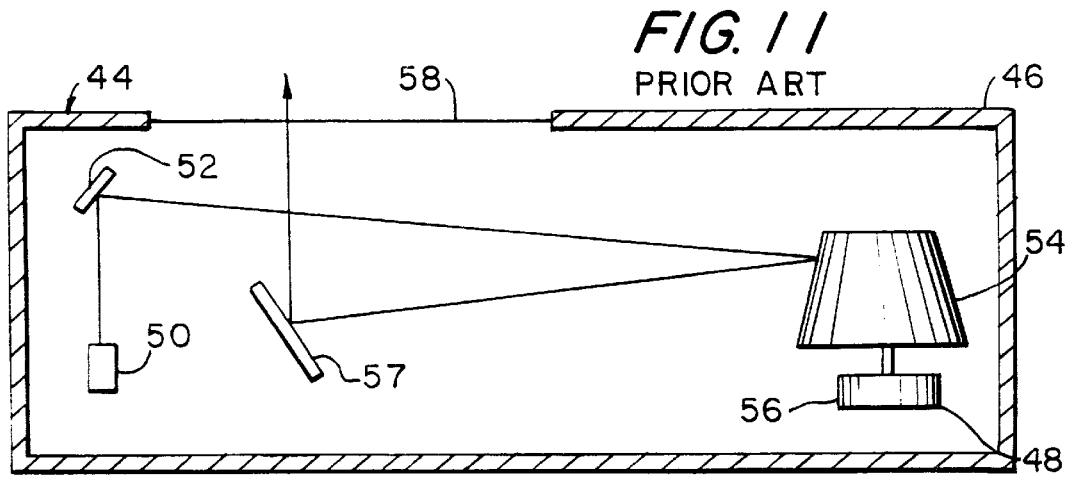
FIG. 11 is a schematic view of a third prior art arrangement, previously described.

FIG. 8 illustrates a mechanism for changing the focusing of the outgoing laser beam in an optical scanner. This mechanism may be used in association with any of the embodiments herein disclosed.

A laser diode assembly 300 has, mounted to its front face, a lens holder 302. The lens holder supports a focusing lens 304 within a central of primary aperture 306. In normal use, a laser beam emerges through the lens 304, with the aperture 306 acting as a circular stop to provide a beam of circular cross-section. Such a beam is useful when an omnidirectional scan pattern is to be produced; however, when a single scan line is being used, it is advantageous to use an elliptical laser spot for improved performance on poor quality symbols. This may be achieved in the present embodiment by selectively moving a secondary rectangular aperture 308 into the path of the beam.

To that end, an aperture changing mechanism is provided consisting of a molded plastics material member 310 that may be rotated from a first position, shown in FIG. 8b, in which the member is clear of the primary aperture 306; and a second position, shown in FIG. 8c, in which the beam is stopped down by the secondary aperture 308. The moving member is mounted to the laser diode assembly 300 on bearings 312, 314. A pivot arm shaft 316 passes through the bearings and has, at its forward end, a shaped aperture plate 318 which has a cut-out to define the aperture 308. To minimise friction and wear at the bearings, the moving parts may be of low-friction material such as Teflon (registered trade mark)—impregnated Delrin (registered trade mark). A magnet 320 mounted to an arm 319 of the plate causes the plate to rotate about the bearings according to current passing through the stationary coil 332. When the current is passed through the coil, the magnet is pulled towards the coil; reversing the current in the coil pushes the magnet away and rotates the plate in the opposite direction. Alternatively, a spring or other biasing device (not shown) could be used to rotate the mechanism in one direction, with the coil being used to rotate it only in the other direction.

In the first position, shown in FIG. 8b, a shoulder 324 of the plate abuts a stop or post on the lens holder 302. In the second position, shown in FIG. 8c, a side 328 of the plate abuts the stop 326. Preferably, the stop or post 326 is diecast as an integral part of the lens holder 302.

The aperture 308 may, but need not, carry a further focusing lens.

This allows not only the profile of the laser beam to be altered, but also its focus.

In an alternative arrangement (not shown) movement of the plate 318 could be achieved piezoelectrically, or electrostatically rather than electromechanically.

The mechanism of FIG. 8 will typically be used within a hand-held or fixed optical scanner which is designed for both one-dimensional and for two-dimensional scanning. It is of course necessary to select the proper aperture for the way in which the scanner is to be used. In the preferred scanner, the primary aperture 306 is automatically selected whenever the scanner is in single line mode. Single line mode may be selected manually by the user, or automatically whenever the scanner is lifted out of its stand. In this way, the scanner may be used as a stand-mounted omnidirectional presentation scanner and a single line hand-held scanner without requiring the user to operate any controls.

Aperture switching is also useful for extending the usable depth of focus of a scanner beyond that which can be provided by a single aperture. In this case, the secondary aperture is used to provide a near working range and the primary aperture is used to provide more laser power, and to shift the focus further out to provide a far working range. Some means needs to be provided to select the proper aperture (or working range) on any given scan attempt. This can be accomplished in several ways, as follows.

The working range can be selected manually by the user. If he or she desires to scan a symbol far away, he or she can select the far range. If a near symbol is to be scanned, the near range can be selected. The selection can be made by pushing one or two buttons, selecting one of two positions on a two-position trigger switch, and so on.

Figure 16:
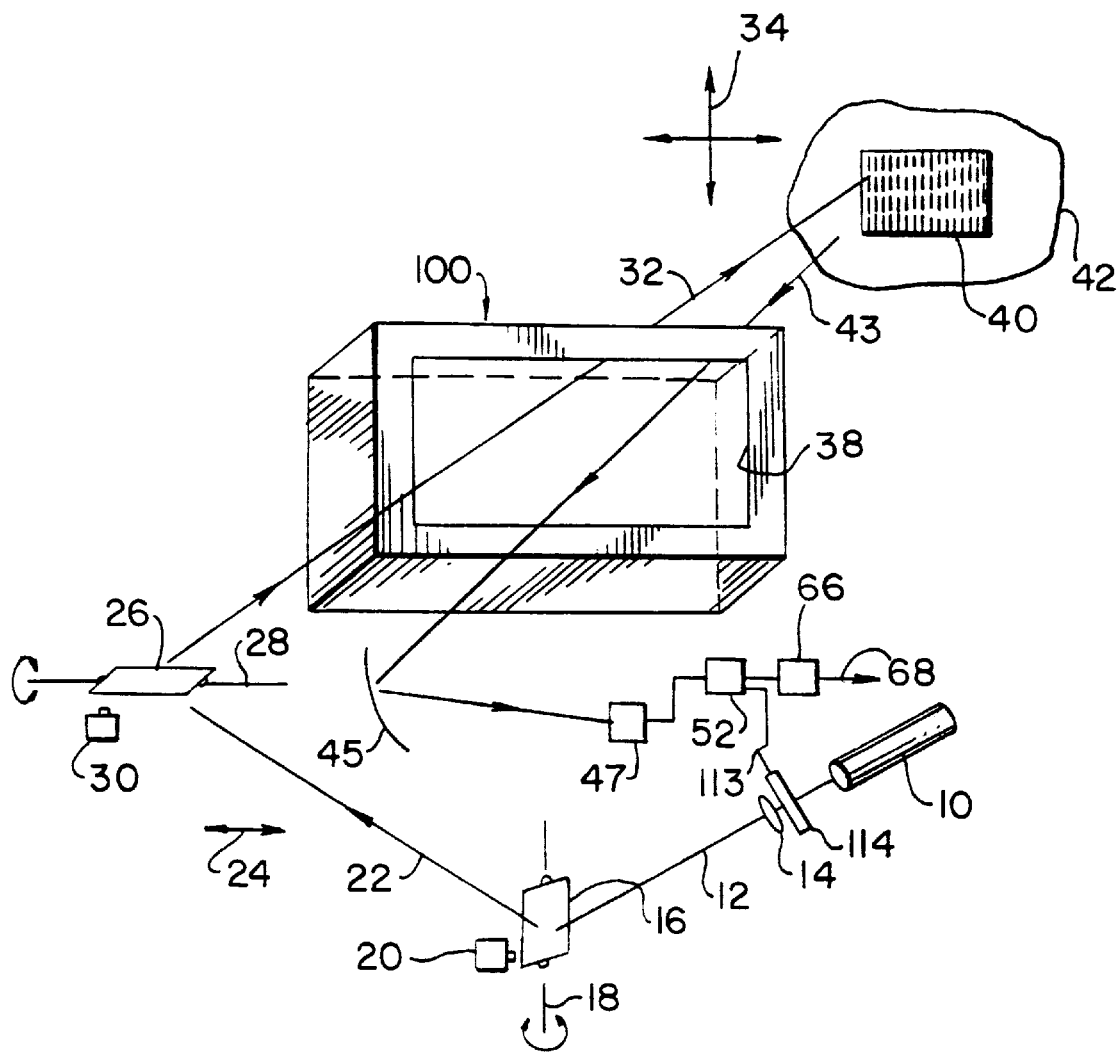
FIG. 16 shows a variation of the internal arrangement of FIG. 15 when used in conjunction with an automatic aperture changing mechanism.

In some circumstances, it would, however, be more desirable for the scanner automatically to select the proper aperture. This eliminates the need for judgement on the user's part, and the time wasted when the wrong aperture is selected. Reference should be made to FIG. 16 which shows schematically how the aperture switching may be controlled in practice. FIG. 16 corresponds to FIG. 15 except for the addition of an aperture/focus switching mechanism 114 in the outgoing laser beam 12; this may be the mechamism shown in FIG. 8. Control is provided along a line 113 in response to an output of the digitizer 52, as described in more detail below. The motor 20,30 may be controlled so that both mirrors scan when one aperture is selected but only one scans when the other is selected.

The scanning system intelligently to select the proper aperture based on analysis of the reflected light signal from the symbol being scanned. If the proper aperture is selected, the depth of modulation of the analog signal will be good enough for the scanner to decode. Depth of modulation can be measured by the scanner e.g. by digitizer. If it is not good enough, the aperture can be switched. Alternatively, the scanner can compare the depth of modulation of two successive scans, each using different apertures. It can determine which of the apertures provides the best modulation. It will then select that aperture for the remainder of the scan attempt. This process, which can be fast enough to be unnoticeable by the scanner user, can be repeated every trigger pull. The scanner can also remember which aperture provided the previous decode and try that one first. Alternatively, it can try the aperture first that provided the largest number of previous decodes.

A scanner with switchable apertures may often be used where some of the symbols to be scanned are very far away. Scanners used to read symbols far away are often provided with an aiming mode that is used to position the laser beam on the symbol before actual scanning is attempted. When in the aiming mode, the scanner usually provides either a stationary laser spot, or moves the spot over an angle that is much less than the normal scan angle. Either of these aiming modes increases the visibility of the laser beam to facilitate aiming. This also helps eliminate accidental scanning of the wrong symbol.

If the aiming mode that moves the beam over a narrow scan angle is used (as opposed to a stationary spot) the aperture selection can be made by examining the signal while the scanner is still in the aiming mode. In this way, the proper aperture can be immediately selected when the scanner switches from aiming mode to scanning mode. A good way to measure the depth of modulation of the analog signal provided by each aperture is as follows:

It is common practice to differentiate the analog signal as a part of the signal processing in many laser scanners. The height of the peaks of the differentiated analog signal are related to the depth of modulation of the analog signal. If the laser is focused to a spot small enough to decode the symbol being scanned, the peaks of the first derivative of the analog signal will all be similar in height. If, on the other hand, the laser is defocused (or if the wrong aperture is selected) there will be large variation in the peak heights. Therefore, if the heights of several peaks are measured, it can be determined if focus is good enough to decode. Alternatively, several peaks can be measured with each aperture. The one with the least variation in peak heights is the one that should be used.

A good way to measure the peaks is as follows. The scanner uses a digitizer that locates the edges to the bars and spaces of the symbol being scanned. This is frequently done by locating the peaks of the first derivative of the analog signal. Therefore, transitions at the output of the digitizer occur at about the same time that the first derivative is near a peak. The transitions occurring at the output of the digitizer can therefore be used to indicate when the peak heights should be measured.

Many inexpensive microprocessors are available today that include an on-chip A to D converter. This converter can sample the first derivative at several neighboring transitions of the analog signal. The depth of modulation of the signal can be determined from the data obtained this way. The microprocessor can then enable the appropriate aperture.

If the depth of modulation is measured during the aiming mode it is unlikely that the system will be fooled by the beam scanning other things other than the bar code symbol that might have features larger than the real bars and spaces. In the aiming mode, the scan line is short enough that it does not extend very far beyond the real symbol.

The microprocessor can be the same one used for decoding if desired. If not, the microprocessor can still be used for other control functions such as trigger sensing, time outs, and so on.

Figure 17:
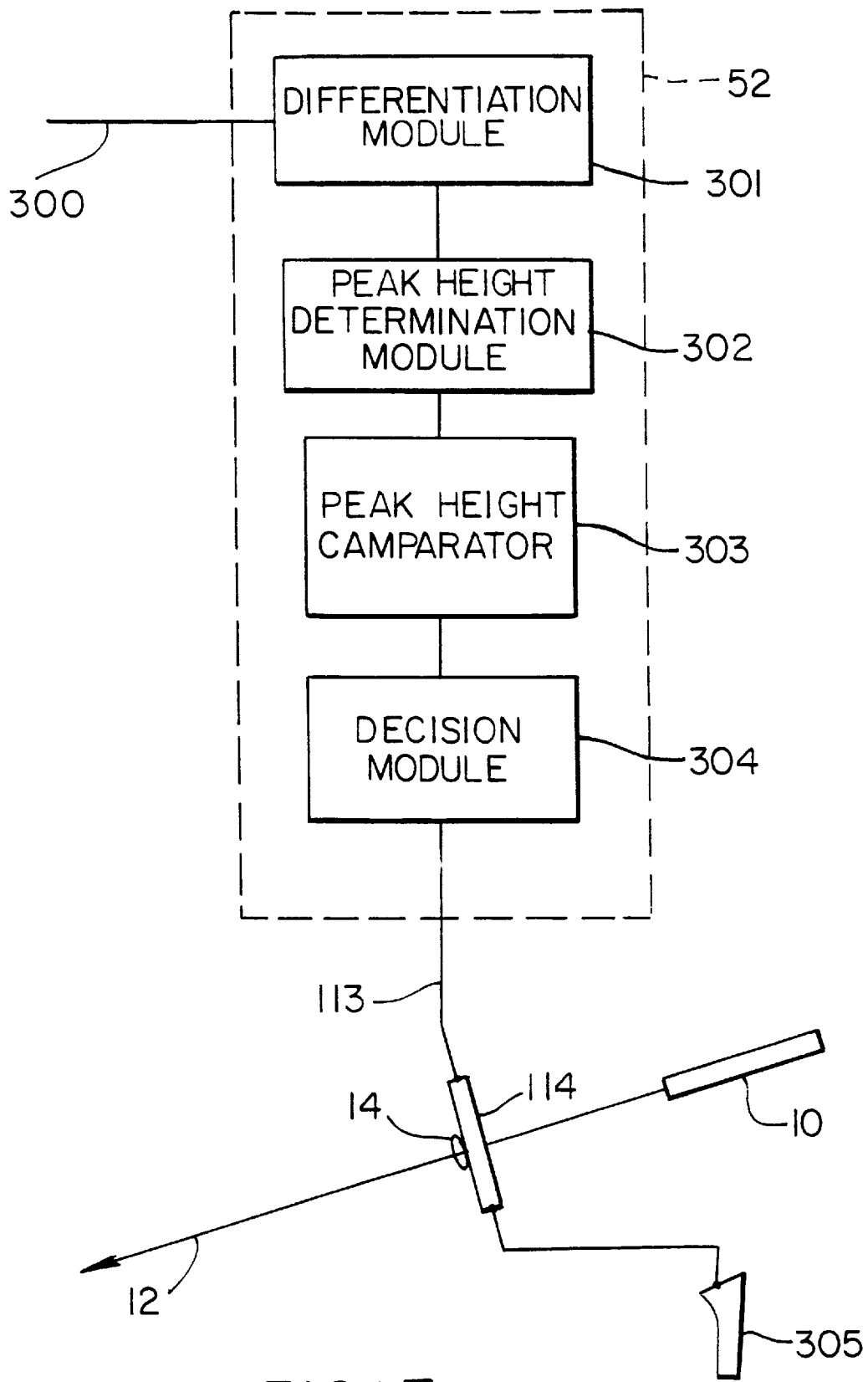
FIG. 17 shows in more detail the control mechanism of the embodiment of FIG. 16.

One particular exemplary embodiment is shown in more detail in FIG. 17. In this Figure, identical elements are referred to by the same reference numerals as are used in FIG. 16. The analog signal from the photodetector arrives at the digitizer 52 along a line 300. The analog signal is differentiated by a differentiation module 301, and the heights of the peaks within the differentiated signal are then calculated by a peak height determination module 302. The peak heights are then compared by a peak height comparator 303, either one with another within the same signal, or alternatively between a first scan using the first aperture and a second scan using the second aperture. The output of the peak height comparator 303 is passed to a decision module 304 which issues a control signal along the line 113 to select the preferred aperture from the aperture/focus switching mechanism 114.

Alternatively, or in addition, a particular aperture may be chosen manually by means of a two-position trigger switch 305, manually operable by the user.

Figure 12:
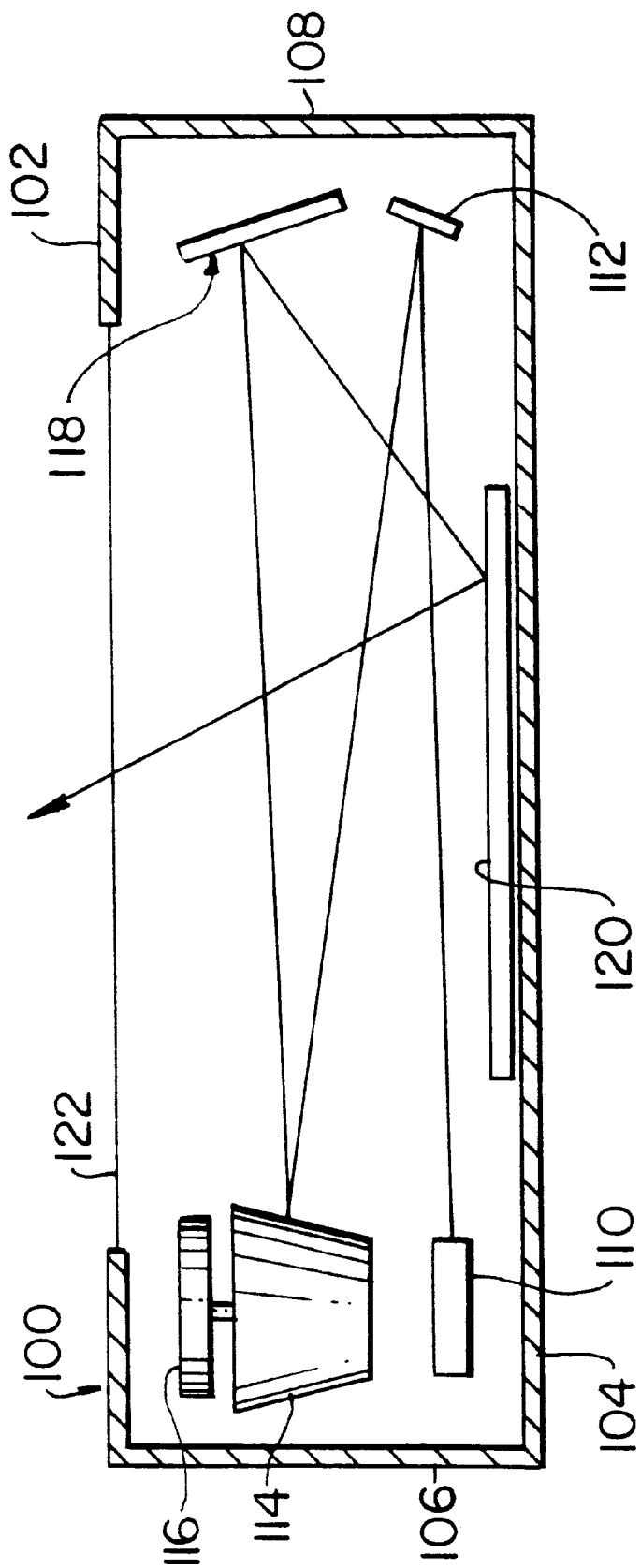
FIG. 12 is a schematic view of a scanner according to a further preferred embodiment of the present invention.

Referring now to FIG. 12, there is shown in schematic form a further scanner embodying the present invention. The scanner includes a compact housing 100 having front and rear faces 102,104 and side faces 106,108. End faces (not shown in the diagram) are also provided. The depth between the faces 102,104 is 3 inches (7.6 centimeters), the width between the faces 106,108 is 6 inches (15.2 centimeters) and the length is 5.5 inches (14.0 centimeters).

A laser 110, preferably a visible laser diode (VLD) emits a beam which travels substantially parallel with the lower surface 104 of the housing. The beam is then reflected from a small stationary fold mirror 112 onto a rotating polygonal mirror 114 which is actuated by an electric motor 116. The beam is reflected off the polygonal mirror 114, back across the housing, to a plurality of stationary angled pattern mirrors 118. The resultant pattern is reflected downwardly, back to the floor of the scanner as shown in the drawing, to a bottom mirror 120. The pattern reflected off the bottom mirror then passes out of the scanner via a large window 122.

It will be noted that the stationary pattern mirrors 118 face generally downwards within the housing, away from the window 122. This feature, along with the provision of the bottom mirror 120, provides a long optical path within the scanner, thereby enabling a large scanning pattern to be provided immediately adjacent the window 122. Since the pattern is large, the window 122 is also large, and as may be seen takes up most of the area of the face 102.

Because the window is large, the scanner is ideal for being placed with the window 122 vertically, on a counter-top. The scan pattern extends very close to the edge of the scanner housing, so that the scanner can sit on top of the counter and the scan pattern will extend down close to the counter-top, where it can intercept symbols near the bottoms of packages sliding past the scanner on the counter-top.

Figure 13:
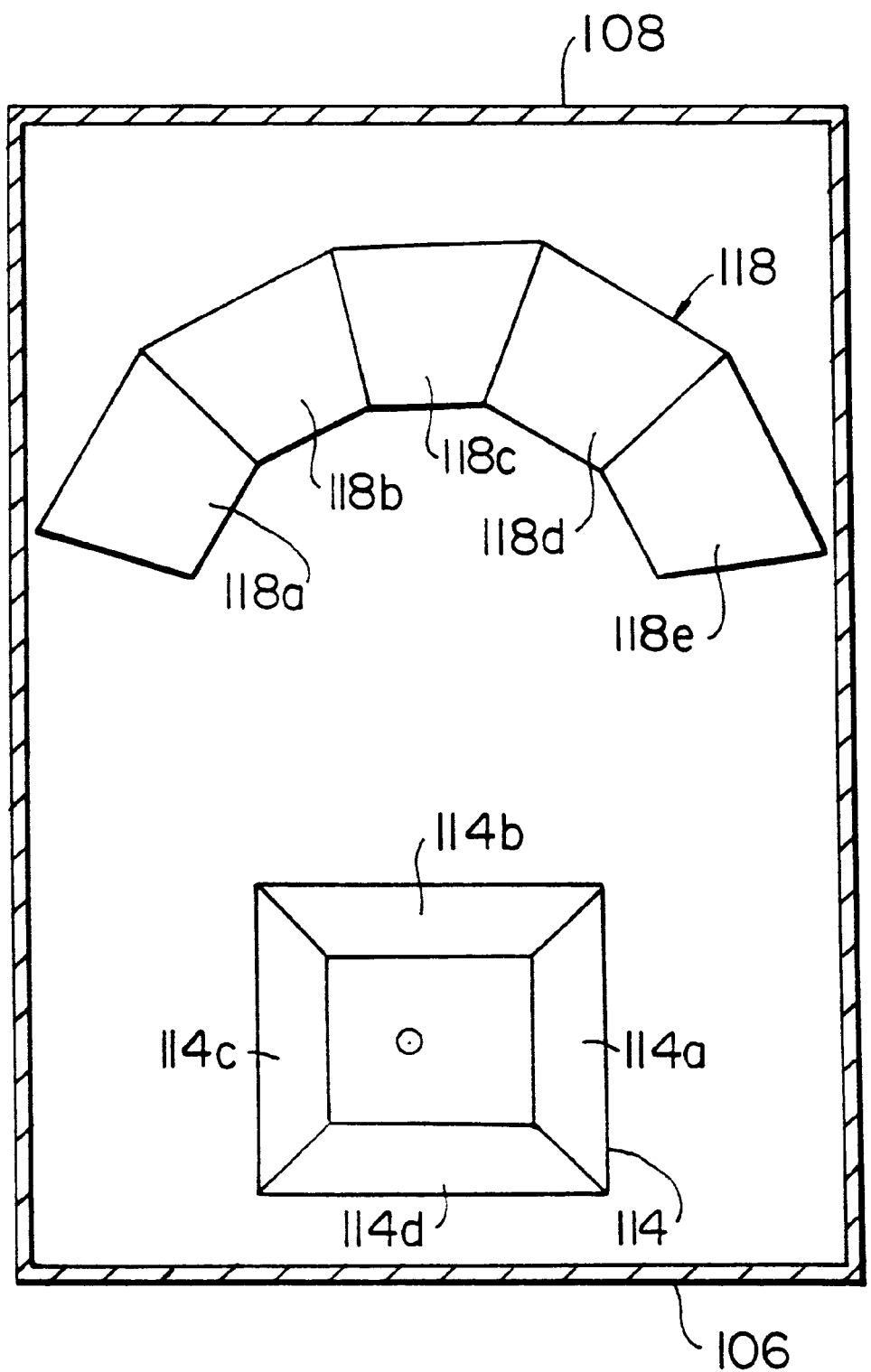
FIG. 13 shows, schematically, the polygonal mirror and the pattern mirrors of the arrangement of FIG. 12, from below.
Figure 14A:
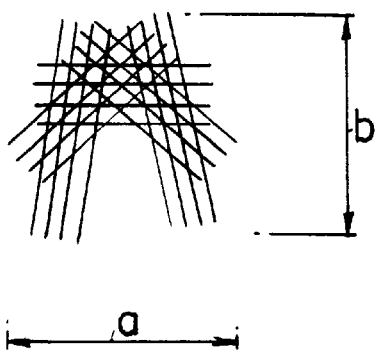
FIGS. 14a to 14c illustrate preferred scanning patterns.
Figure 14B:
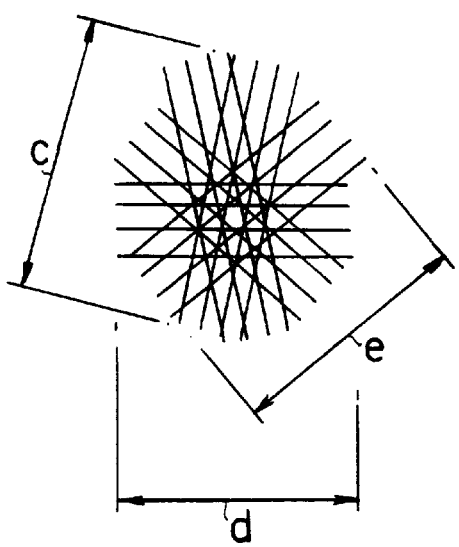
Figure 14C:
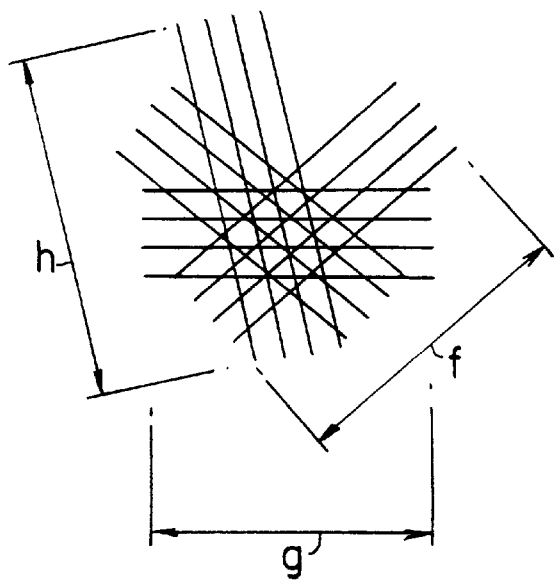

FIG. 13 shows the preferred arrangement of the polygonal mirror 114 and the pattern mirrors 118. As will be seen, the polygonal mirror is preferably square in plan view, with four individual mirror facets 114a to d. The pattern mirror 118 is of half-crown shape, and comprises five angled stationary mirror facets 118a to e. In use, the laser light is directed off of the polygonal mirror 114, onto the stationary pattern mirrors 118. After being reflected again from the bottom mirror 120 (FIG. 12) a scan pattern such as those illustrated in FIGS. 14a to 14c is produced. The pattern comprises twenty lines in total, which together form a cross-hatch arrangement. As may be seen, each pattern features five line sets of four lines per set, with each line set being positioned approximately 36° from one another. This particular pattern provides dense line coverage both at the face of the scanner and as far out as 8 inches (20 centimeters), thereby reducing the amount of required bar code orientation necessary to intersect a scan line, irrespective of how or at what angle the bar code symbol is presented to the scanner.

FIG. 14a shows the pattern at the window 58; FIG. 14b shows the pattern at about 3 inches (8 centimeters) from the window; and FIG. 14c shows the pattern at 4.25 inches (10.8 centimeters) from the window. The preferred dimensions are as follows:

a=2.214 inches (5.624 centimeters),
b=1.962 inches (4.983 centimeters), c=3.6 inches (9.1 centimeters),
d=3.1 inches (7.9 centimeters),
e=3.2 inches (8.1 centimeters),
f=3.9 inches (9.9 centimeters),
g=3.6 inches (9.1 centimeters), and
h=4.6 inches (11.7 centimeters).

It will be appreciated that in other embodiments (not shown) there may be a different number of facets on the polygonal mirror 114, and there may be a different number of facets on the half-crown stationary pattern mirror 118.

Figure 18:
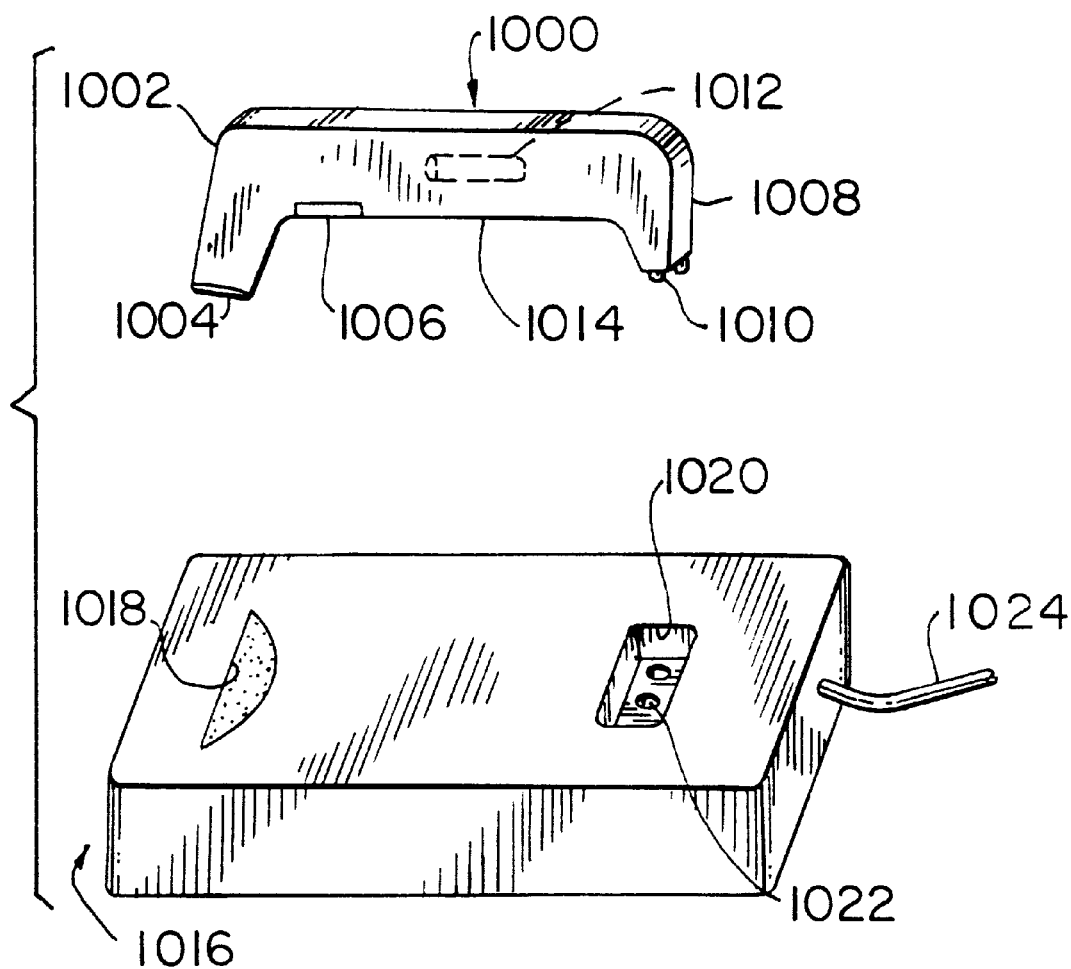
FIG. 18 shows an exemplary charging stand for an optical character reader.

Any or all of the previous embodiments may be battery operated, and may have an associated charging stand on which the scanner is placed when the batteries need to be recharged. The exact configuration of the charging stand of course depends upon the size and shape of the scanner it serves, but one particular embodiment, for use with a telephone-handset shaped scanner 1000, is shown in FIG. 18. The scanner itself includes a head portion 1002, having a window 1004 through which the scanning laser beam passes when actuated by the user by means of a manually operable trigger 1006. The scanner 1000 also includes a foot or tail portion 1008, having electrical contacts 1010 which are coupled to a battery pack 1012 within the main body 1014 of the scanner.

When the scanner is to be charged, it is placed in a charging stand 1016, having a first depression 1018 shaped to take the head portion 1002, and a second depression 1020 shaped to take the tail portion 1008. At the base of the depression 1020 are electrical contacts 1022 which, when the scanner is in place, touch the contacts 1010. Electrical power to the contacts 1022 is provided by a mains power lead 1024.

The charging stand 1016 preferably has a flat base, so that it may be placed in any convenient position on the desk-top by the user. When the user has finished with the scanner, he or she merely places it straight into the stand where it receives a battery recharge without the user needing to make any special arrangements. The stand 1016 acts both as a charger and as a convenient location for the scanner when not in use.

In environments in which h static electric charges may represent a hazard, for example on production lines for manufacturing computer memory chips, it may be desirable to manufacture the scanner housing of a static-dissipative material. This could apply to any of the scanners disclosed herein. Preferably, the scanner housing may be manufactured by injection molding, using a polymer alloy having a stainless steel filler to provide electrical conductivity. A suitable substance is ABS (Acrylonitrile-Butadiene-Styrene). A similar material may be used to manufacture the trigger. To prevent static charges from building up on the optical window, the window may be coated with a very thin layer of a transparent charge dissipative material, such as gold.

As previously mentioned, the preferred scanner is a hand-held, omni-directional scanner of the type exemplified by FIGS. 6a and 6b. The omni-directional scan pattern changes in size as a function of distance away from the exit window, as depicted in FIGS. 14a, b and c. It has been observed that no matter where the scan pattern is positioned relative to the window in order to optimize reading of the symbol, the user still holds the scanner up close to the window and frequently in contact with the scanner.

Hence, in accordance with another feature of this invention, the optical path and/or the mirror placement within the scanner is designed so that the optimum scan pattern, e.g., that shown in FIG. 14b, is located at, or closely adjacent the exit window and, more importantly, the area or size of the optimum scan pattern substantially equals the size or area of a standard symbol to be read. For example, if a one-dimensional UPC symbol to be read measures about 1" (25.4 mm) in length and $9/16$" (14.3 mm) in height, then the scan pattern at the window is optimized to have the same dimensions. This is schematically shown in FIG. 6b where the UPC symbol 10 has an area which substantially equals the area of the scan pattern 20 at the exit window 163. In addition, the area of the exit window 163 itself substantially equals the area of the symbol 10.

Still another feature of this invention relates to moving a pair of parallel scan lines apart from each other during scanning. Thus, as described and illustrated in U.S. Ser. No. 08/542,517, filed Oct. 13, 1995, the entire disclosure of which is hereby incorporated by reference herein, two scan lines which are initially approximately $1/8$" (3.175 mm) apart in a narrow-pattern are gradually moved away from each other over the entire height of either a one-dimensional or a two-dimensional symbol to a wide-pattern in which the scan lines are spaced apart approximately $1/2$" ($12\frac{1}{2}$ mm) or more. In the narrow-pattern, the scan lines can be used to enhance the visibility of the scan pattern on the symbol, or to read at least a portion of the symbol. In the wide-pattern the scan lines are used to read the remaining portion of the symbol.

It will be understood that each of the elements described above, or two or more together, may also find a useful application in other types of constructions differing from the type described above.

It is to be understood that the overall inventive concept is not intended to be limited to the details shown in the specific embodiment, since various modifications and structural changes may be made without departing in any way from the spirit and scope of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention, and, therefore, such adaptations should be and are intended to be comprehended within the meaning and range of equivalents of the following claims.

What is claimed as new and desired to be protected by Letters Patent is set forth in the appended claims:

1. A data transfer system, comprising:
   a) a base unit having a receiver;
   b) a unique identifying marker having parts of different light reflectivity associated with the base unit; and
   c) a portable reader having a handle to be held by a user in a hand-held mode of operation, and operative for electro-optically reading the identifying marker in a set-up mode of operation in which the base unit is uniquely identified to the reader, the reader being subsequently operative in a reading mode of operation for electro-optically reading an indicium having parts of different light reflectivity and for generating an electrical signal indicative of the indicium, the reader having a transmitter for transmitting the electrical signal by wireless transmission to the receiver of the uniquely identified base unit.

2. The data transfer system according to claim 1, wherein the base unit includes a stand for supporting the reader in a hands-free mode of operation.

3. The data transfer system according to claim 2, wherein the stand includes a support for resting on a generally planar support surface, an elongated stem having one end connected to the support, and a cradle at an opposite end of the stem and elevated above the support.

4. The data transfer system according to claim 1, wherein the identifying marker is a machine-readable indicium.

5. The data transfer system according to claim 1, wherein the identifying marker is a bar code symbol.

6. The data transfer system according to claim 1, wherein the identifying marker is physically secured to the base unit.

7. The data transfer system according to claim 1, wherein the identifying marker is physically located in proximity to the base unit.

8. The data transfer system according to claim 1, wherein the reader includes a user-actuatable trigger for manually actuating the reading of the identifying marker in the set-up mode, and for manually actuating the reading of the indicium in the reading mode.

9. The data transfer system according to claim 1, wherein the reader includes a light source for directing a light beam at the identifying marker in the set-up mode, and at the indicium in the reading mode; a light sensor having a field of view and operative for detecting light reflected from the identifying marker in the set-up mode, and from the indicium in the reading mode; a scanner for scanning at least one of the light beam and the field of view in each of the set-up mode and the reading mode; and an actuator for manually actuating the reader to initiate reading of the identifying marker in the set-up mode, and to initiate reading of the indicium in the reading mode.

10. The data transfer system according to claim 1, wherein the transmitter and the receiver operate at radio frequencies.

11. The data transfer system according to claim 1; and further comprising additional portable readers identical to said reader, and wherein the base unit is uniquely identified to any selected one of the readers which has read the identifying marker.

12. A method of transfering data, comprising the steps of:
a) associating a unique identifying marker having parts of different light reflectivity with a base unit having a receiver;
b) electro-optically reading the identifying marker with a portable reader held by a user in a set-up mode of operation in which the base unit is uniquely identified to the reader;
c) subsequently electro-optically reading an indicium having parts of different light reflectivity with the reader held by the user in a reading mode of operation in which an electrical signal indicative of the indicium is generated; and
d) transmitting the electrical signal by wireless transmission to the receiver of the uniquely identified base unit.

13. The method according to claim 12, wherein the identifying marker is a machine-readable indicium.

14. The method according to claim 12, wherein the identifying marker is a bar code symbol.

15. The method according to claim 12, wherein the associating step is performed by physically securing the identifying marker to the base unit.

16. The method according to claim 12, wherein the associating step is performed by physically locating the identifying marker in proximity to the base unit.

17. The method according to claim 12, wherein each reading step is initiated by the user manually actuating the reader.

18. The method according to claim 12, wherein each reading step is performed by scanning at least one of a light beam directed at the marker in the set-up mode and at the indicium in the reading mode, and a field of view of a detector operative for detecting light from the marker in the set-up mode and from the indicium in the reading mode.

19. The method according to claim 12, wherein the transmitting step is performed at radio frequencies.

20. The method according to claim 12, and further comprising the step of providing additional portable readers identical to said reader, and wherein the marker reading step is performed by any selected one of the readers.

\* \* \* \* \*